(12) United States Patent
Kozakai et al.

(10) Patent No.: US 11,605,979 B2
(45) Date of Patent: Mar. 14, 2023

(54) POWER RECEIVING DEVICE AND ELECTRONIC APPARATUS

(71) Applicant: Sony Semiconductor Solutions Corporation, Kanagawa (JP)

(72) Inventors: Osamu Kozakai, Kanagawa (JP); Hiroaki Nakano, Tokyo (JP); Takashi Miyamoto, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 58 days.

(21) Appl. No.: 16/310,579

(22) PCT Filed: Jun. 14, 2017

(86) PCT No.: PCT/JP2017/021940
§ 371 (c)(1),
(2) Date: Dec. 17, 2018

(87) PCT Pub. No.: WO2018/020885
PCT Pub. Date: Feb. 1, 2018

(65) Prior Publication Data
US 2019/0148983 A1    May 16, 2019

(30) Foreign Application Priority Data

Jul. 29, 2016 (JP) .............................. JP2016-149321

(51) Int. Cl.
*H02J 50/60* (2016.01)
*H02J 50/12* (2016.01)
(Continued)

(52) U.S. Cl.
CPC ............... *H02J 50/12* (2016.02); *H02J 7/00* (2013.01); *H02J 7/00034* (2020.01); *H02J 7/02* (2013.01); *H02J 50/60* (2016.02); *H02J 50/80* (2016.02)

(58) Field of Classification Search
CPC .. H02J 7/025; H02J 50/90; H02J 50/12; H02J 50/80; H02J 50/40; H02J 5/005;
(Continued)

(56) References Cited

U.S. PATENT DOCUMENTS

2013/0134792 A1* 5/2013 Bunsen ................... H02J 50/80
307/104
2014/0320090 A1* 10/2014 Keeling .................. H02J 50/12
320/162
(Continued)

FOREIGN PATENT DOCUMENTS

JP    2010-252624 A    11/2010
JP    2013-027171 A    2/2013
(Continued)

OTHER PUBLICATIONS

Extended European Search Report dated Apr. 5, 2019 for corresponding European Application No. 17833895.0.
(Continued)

*Primary Examiner* — Binh C Tat
(74) *Attorney, Agent, or Firm* — Michael Best & Friedrich LLP

(57) ABSTRACT

A power receiving device according to the present disclosure includes a power receiving section that receives power from a power feed device with use of a power receiving coil; and a communication section that transmits coil information to the power feed device, the coil information indicating whether or not a coil is provided near the power receiving coil.

17 Claims, 23 Drawing Sheets

(51) Int. Cl.
*H02J 50/80* (2016.01)
*H02J 7/00* (2006.01)
*H02J 7/02* (2016.01)

(58) Field of Classification Search
CPC ........ H02J 50/60; H02J 7/00034; H02J 50/20;
H02J 50/70; H02J 50/005; H02J 50/23;
H02J 7/00; H02J 50/00; H02J 50/50;
H02J 7/00045; H02J 50/10; H02J 7/0027;
H02J 50/27; H02J 7/0044; H02J 7/0047;
H02J 7/00712; H02J 7/0077; H02J 7/345;
H02J 50/402; H02J 50/502; H02J 50/001;
H02J 2310/23; H02J 7/0048; H02J 7/007;
H02J 7/04; H02J 7/02; A61B 8/56; H01L
2924/19042; H01L 2924/19043; A61N
1/37229; A61N 1/3787; A61N 1/37223;
H01F 38/14; H01F 5/00; H01F 17/0006;
H01F 29/02; H01F 41/04; H01F 41/041;
H01F 5/003; H01F 27/28; H01Q 1/38;
H01Q 3/44; H01Q 3/01; A63F
2009/2494; H04L 27/04; H04B 17/318
USPC .................................................. 320/106–115
See application file for complete search history.

(56) References Cited

U.S. PATENT DOCUMENTS

| | | | |
|---|---|---|---|
| 2015/0243442 A1* | 8/2015 | Kanno | H01G 7/06 |
| | | | 307/104 |
| 2015/0357828 A1* | 12/2015 | Ichikawa | H02J 5/005 |
| | | | 307/104 |
| 2016/0114687 A1* | 4/2016 | Ichikawa | B60L 53/37 |
| | | | 307/104 |
| 2016/0164302 A1 | 6/2016 | Nakano et al. | |
| 2016/0181818 A1 | 6/2016 | Joye et al. | |

FOREIGN PATENT DOCUMENTS

| | | |
|---|---|---|
| JP | 2013-027255 A | 2/2013 |
| JP | 2014-011853 A | 1/2014 |
| JP | 2014183628 A | 9/2014 |
| JP | 2015012746 A | 1/2015 |
| JP | 2015-046990 A | 3/2015 |
| JP | 2015-233393 A | 12/2015 |
| JP | 2015536633 A | 12/2015 |
| WO | 2016006441 A1 | 1/2016 |

OTHER PUBLICATIONS

Japanese Office Action dated Aug. 3, 2021 for corresponding Japanese Application No. 2018-529433.

Korean Office Action dated Jul. 22, 2021 for corresponding Korean Application No. 10-2018-7036854.

* cited by examiner

[ FIG. 1 ]
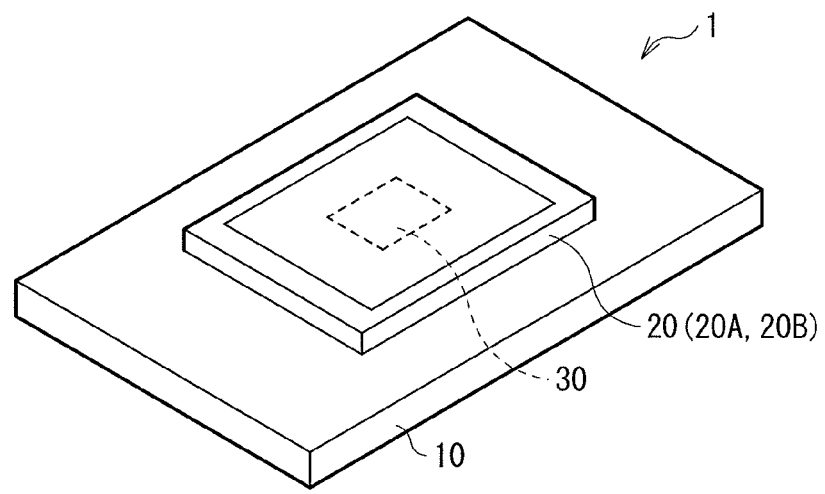
[ FIG. 2 ]
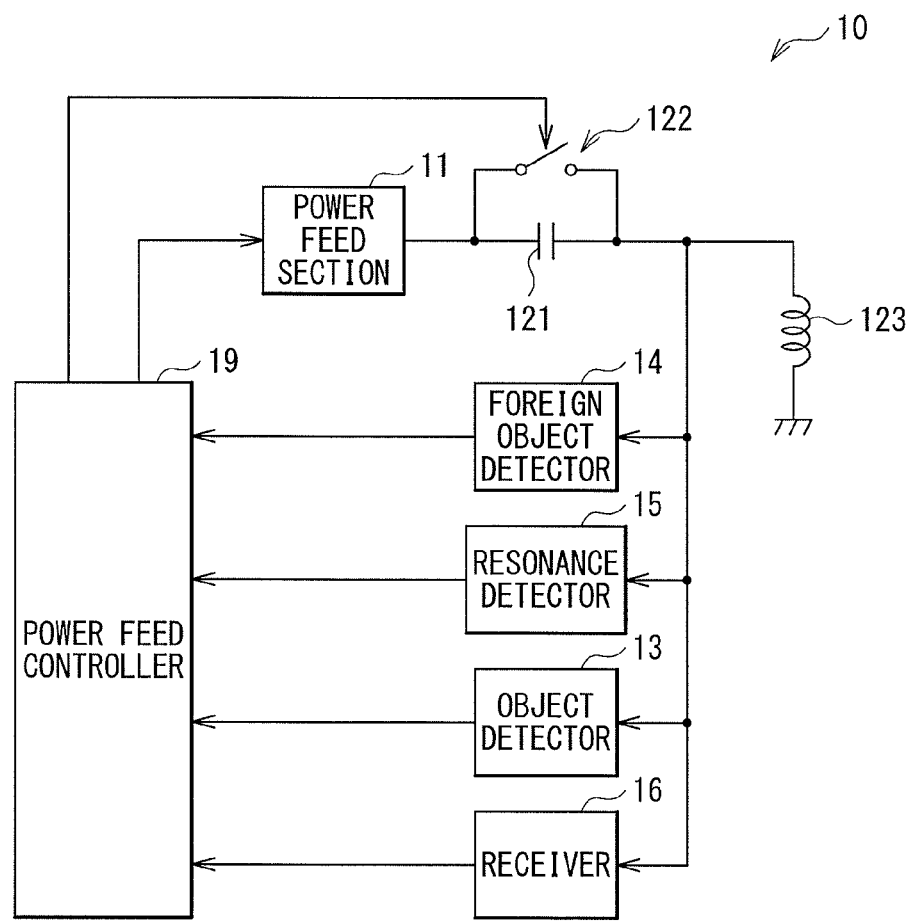

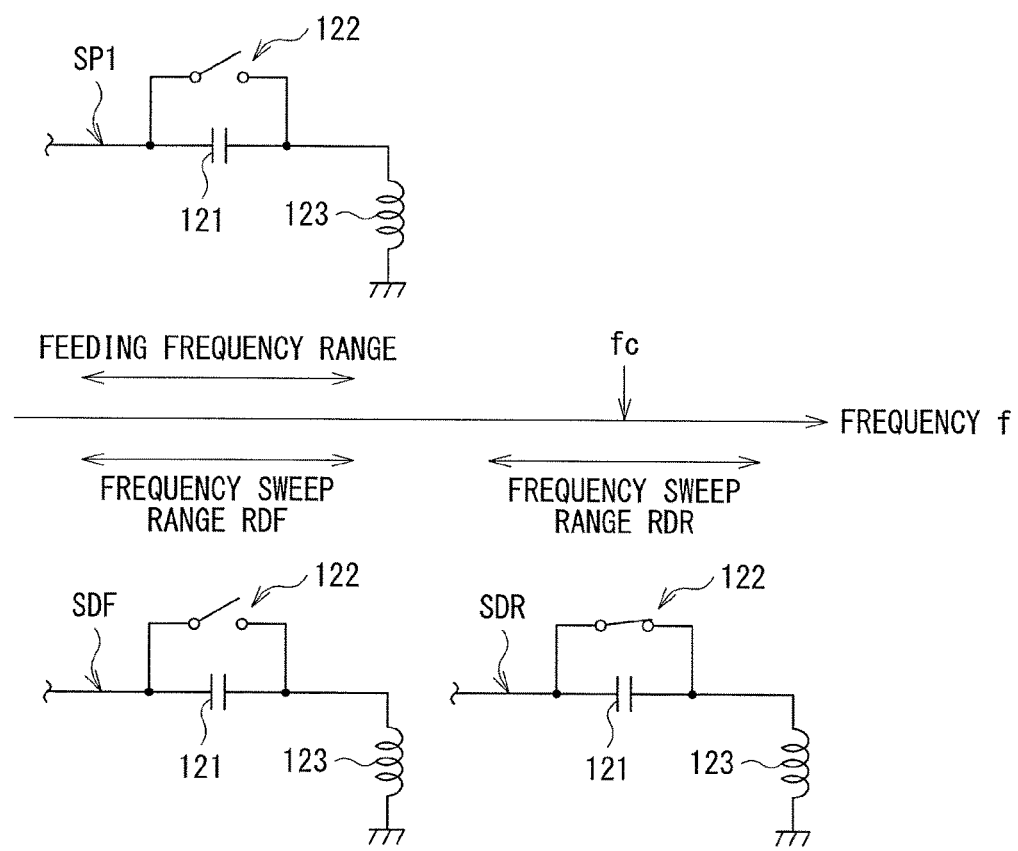
[ FIG. 3 ]

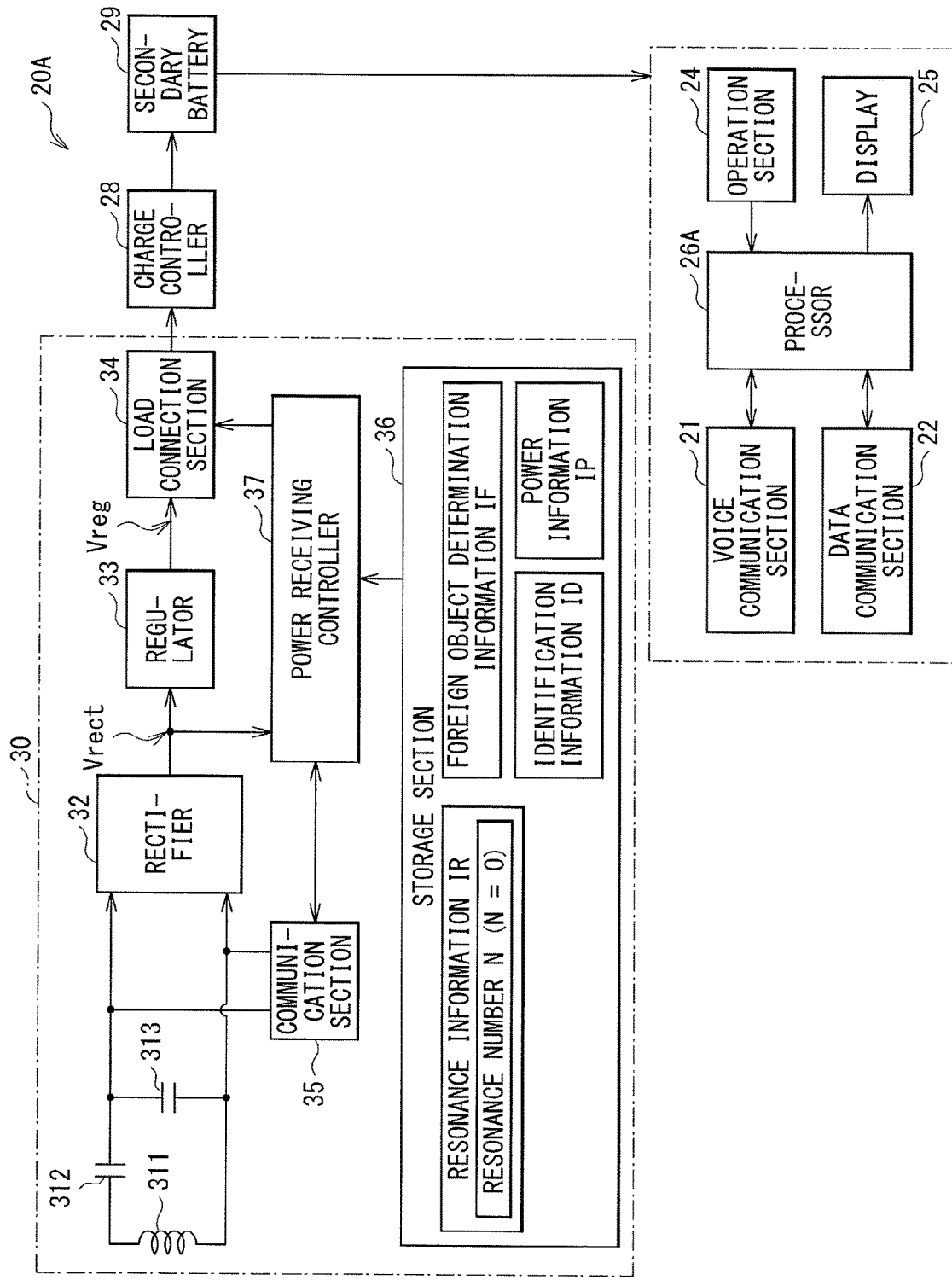
[FIG. 4A]

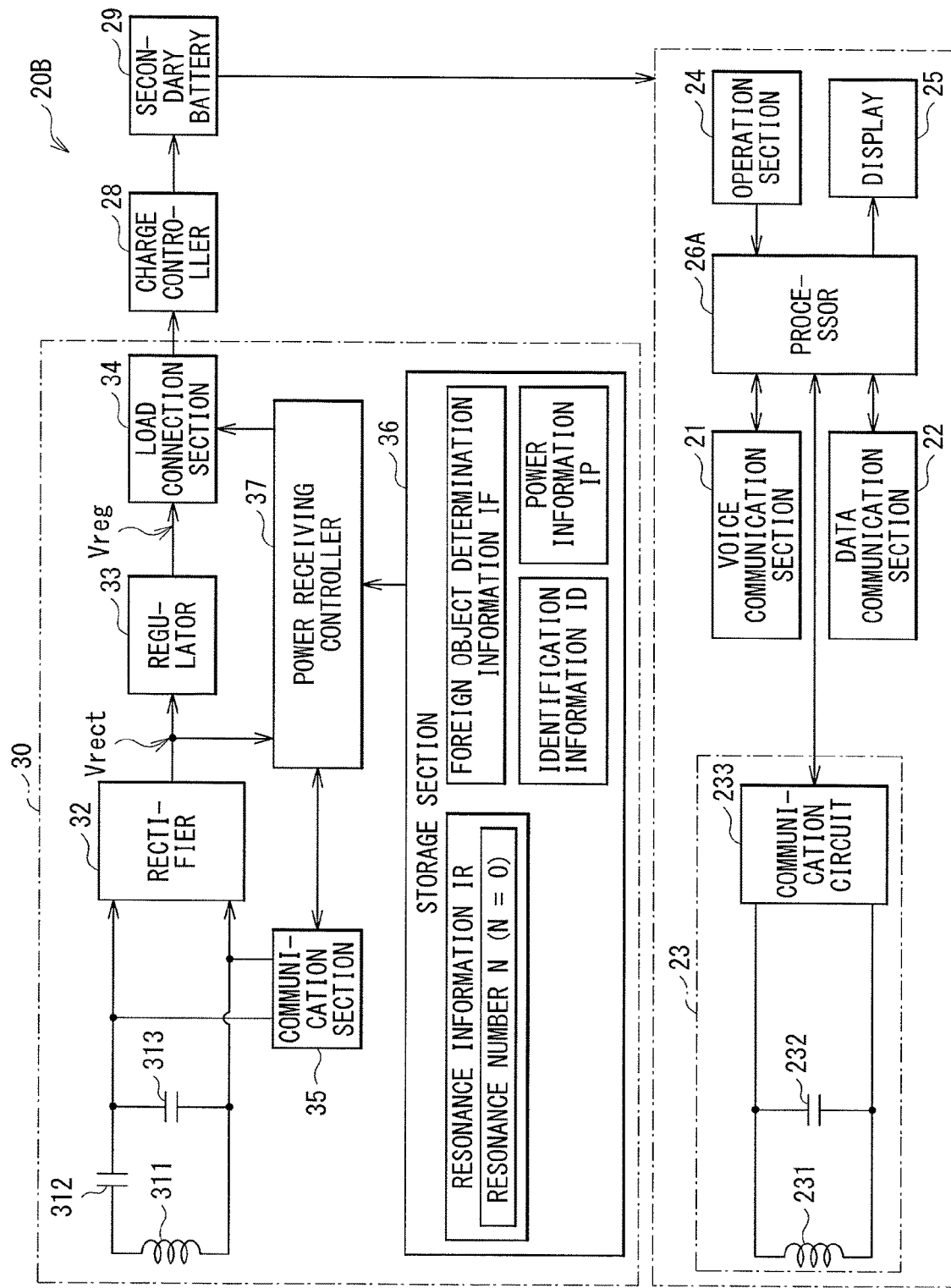
[FIG. 4B]

[ FIG. 5 ]
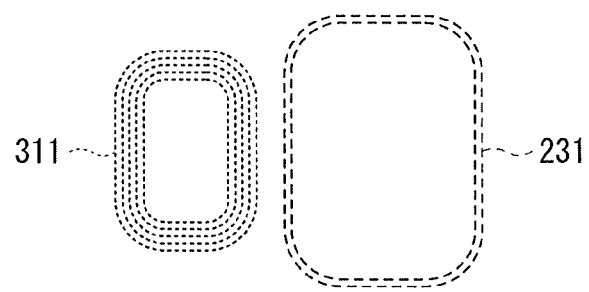
[ FIG. 6 ]
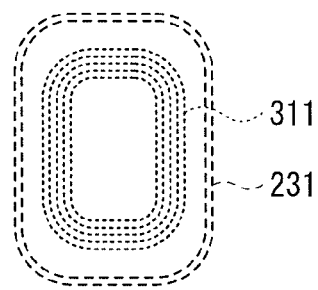

[FIG. 7]
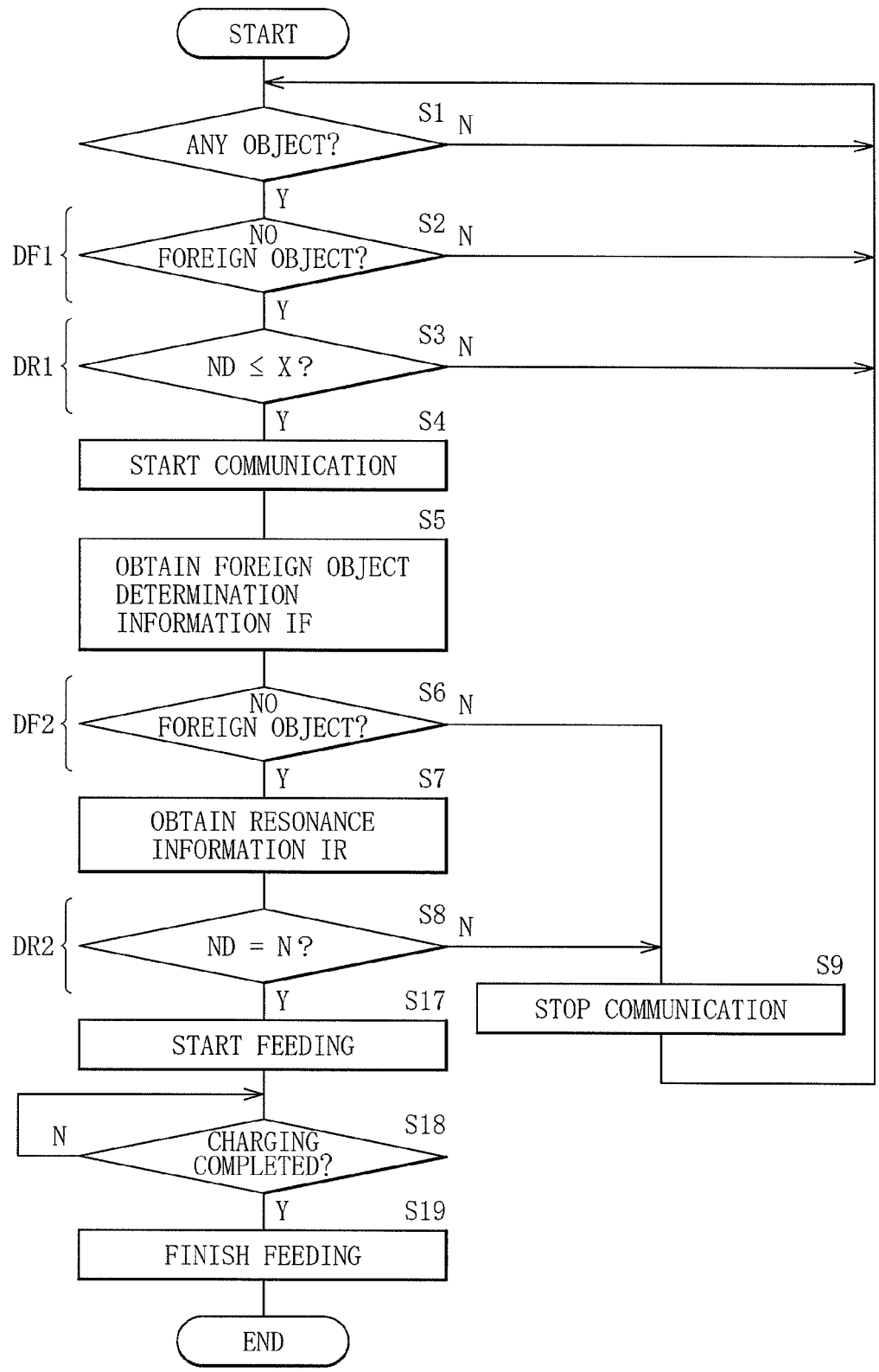

[ FIG. 8 ]
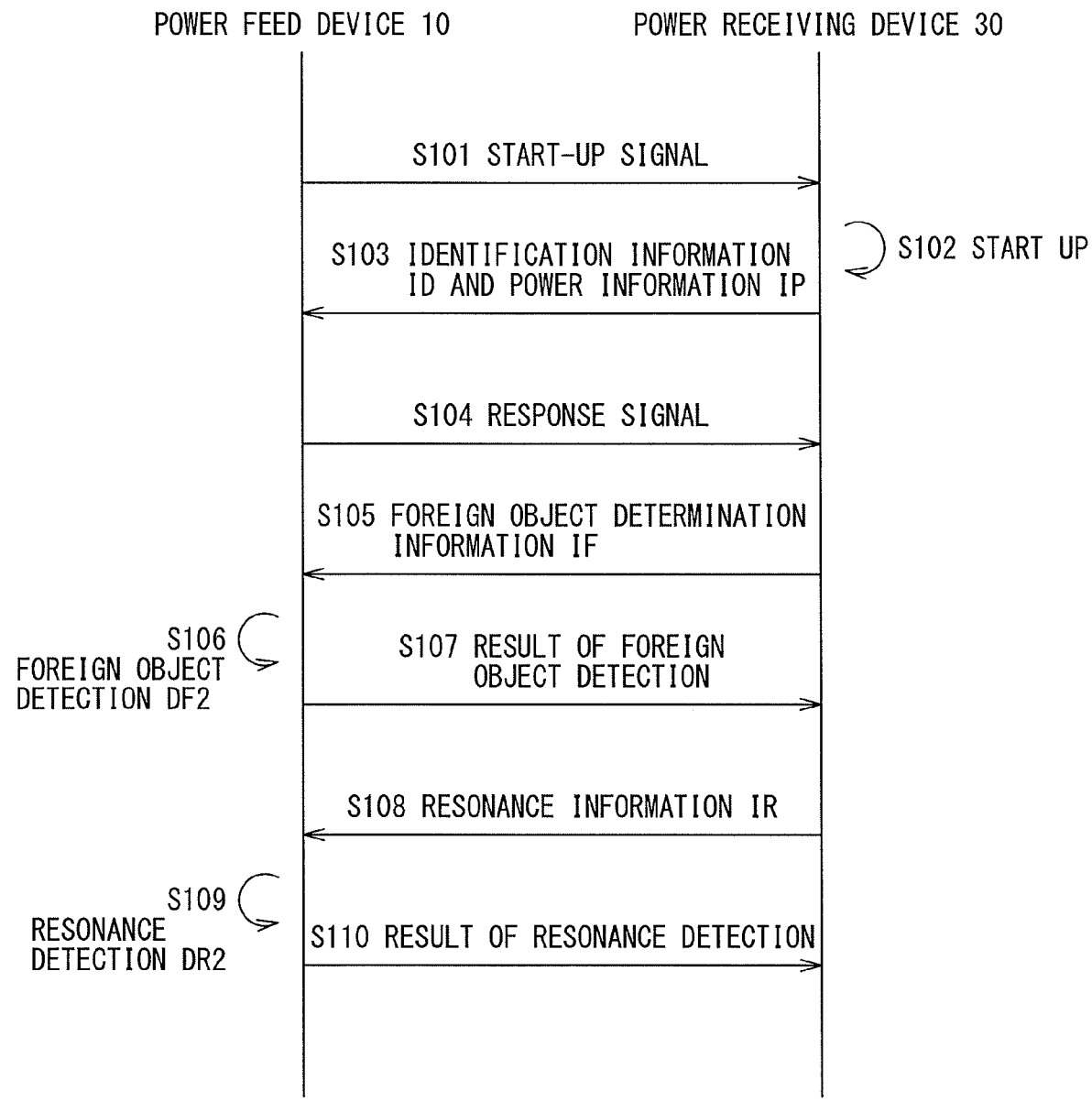

[ FIG. 9 ]
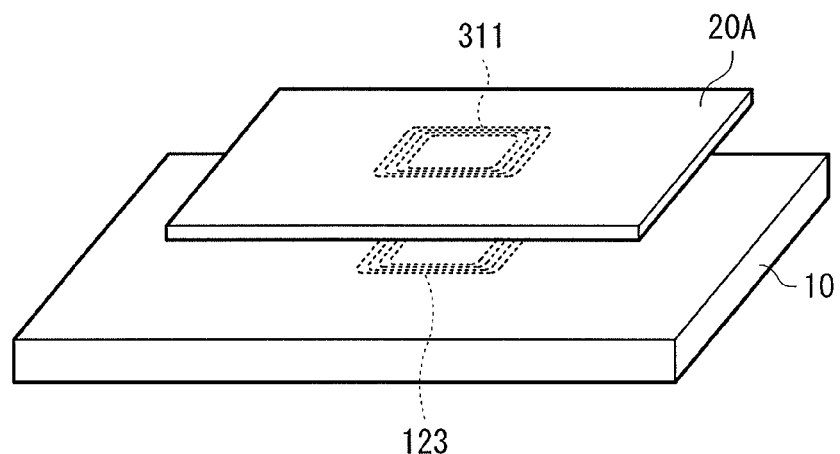
[ FIG. 10 ]
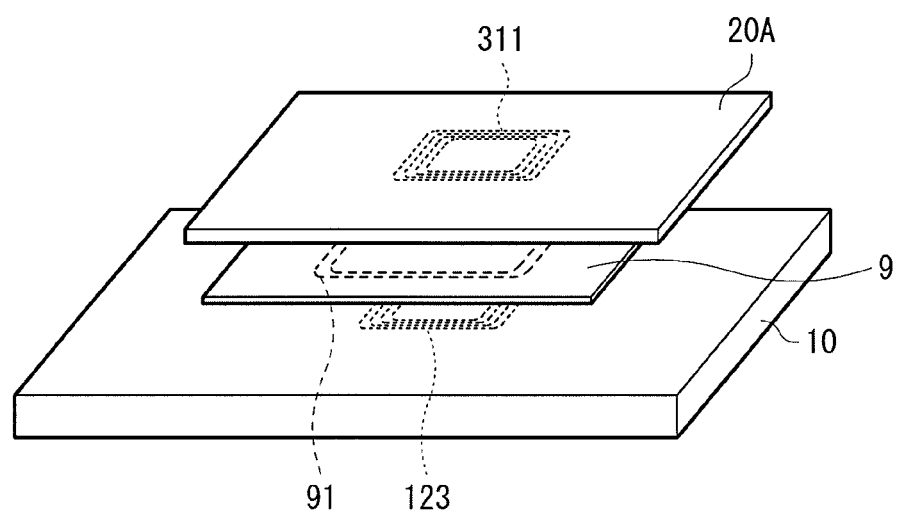

[ FIG. 11A ]
Tr1 S11 Smith (R+jX) scale 1.000u [F1 Del]
1 13.560000 MHz 3.0162 Ω 51.321 Ω 590.62 nH
>2 15.233699 MHz 26.742 Ω 35.856 Ω 374.61 nH
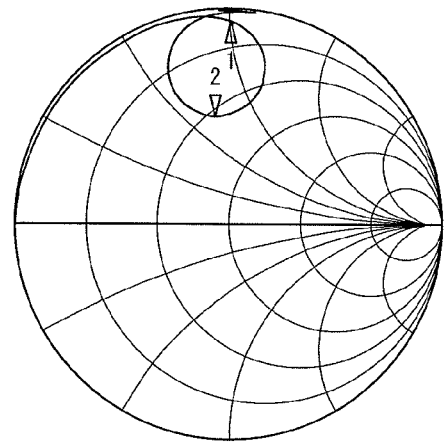
[ FIG. 11B ]
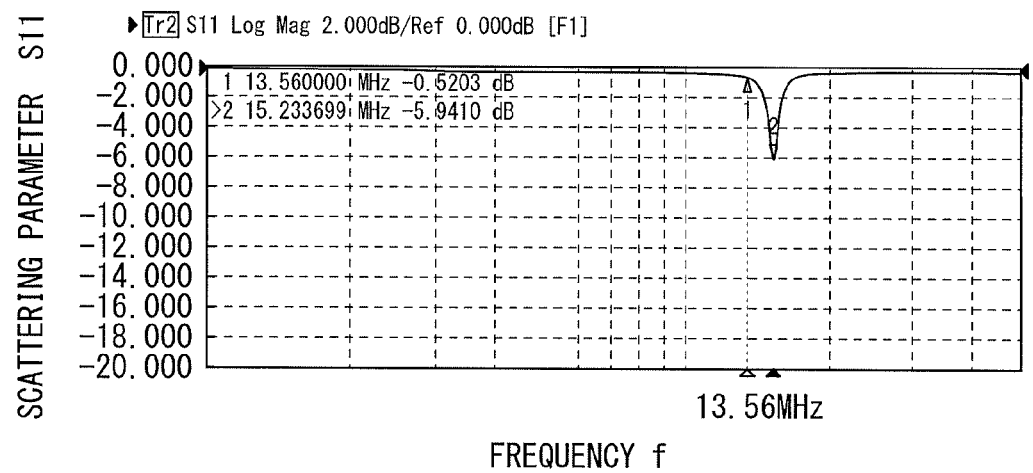

[ FIG. 12 ]
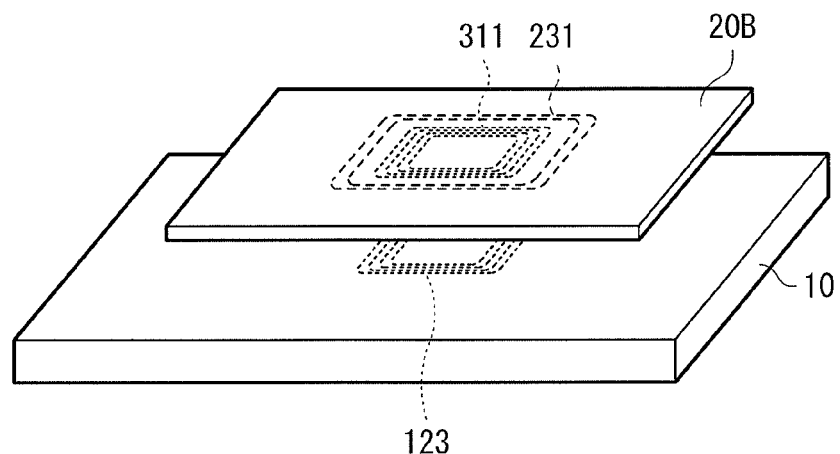
[ FIG. 13 ]
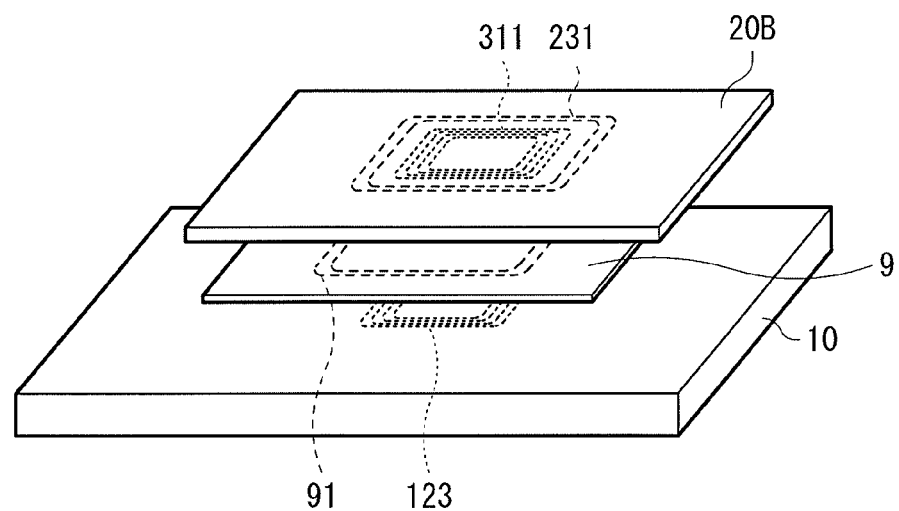

[ FIG. 14A ]
Tr1 S11 Smith (R+jX) scale 1.000u [F1 Del]
1 13.560000 MHz 11.984 Ω 72.551 Ω 851.54 nH
>2 15.233699 MHz 24.183 Ω 19.568 Ω 204.43 nH
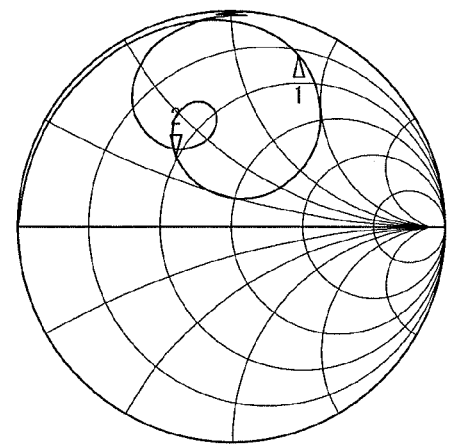
[ FIG. 14B ]
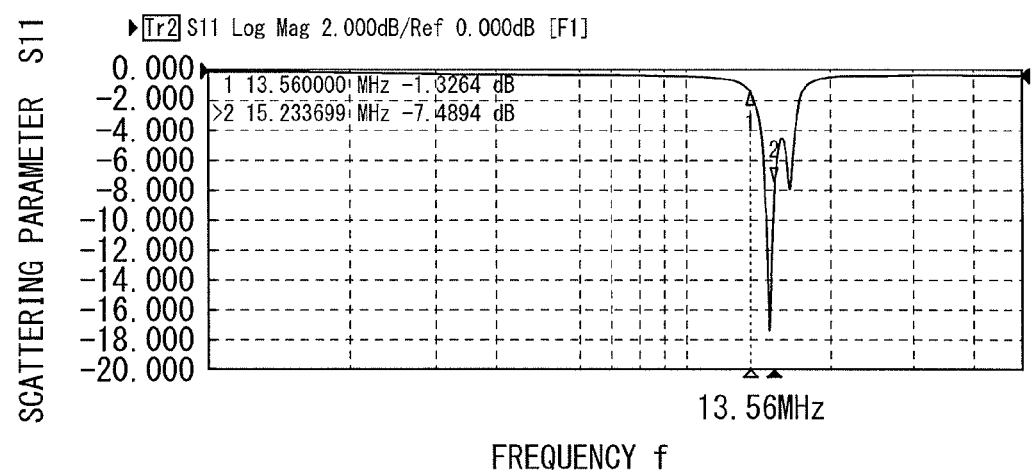

[ FIG. 15 ]
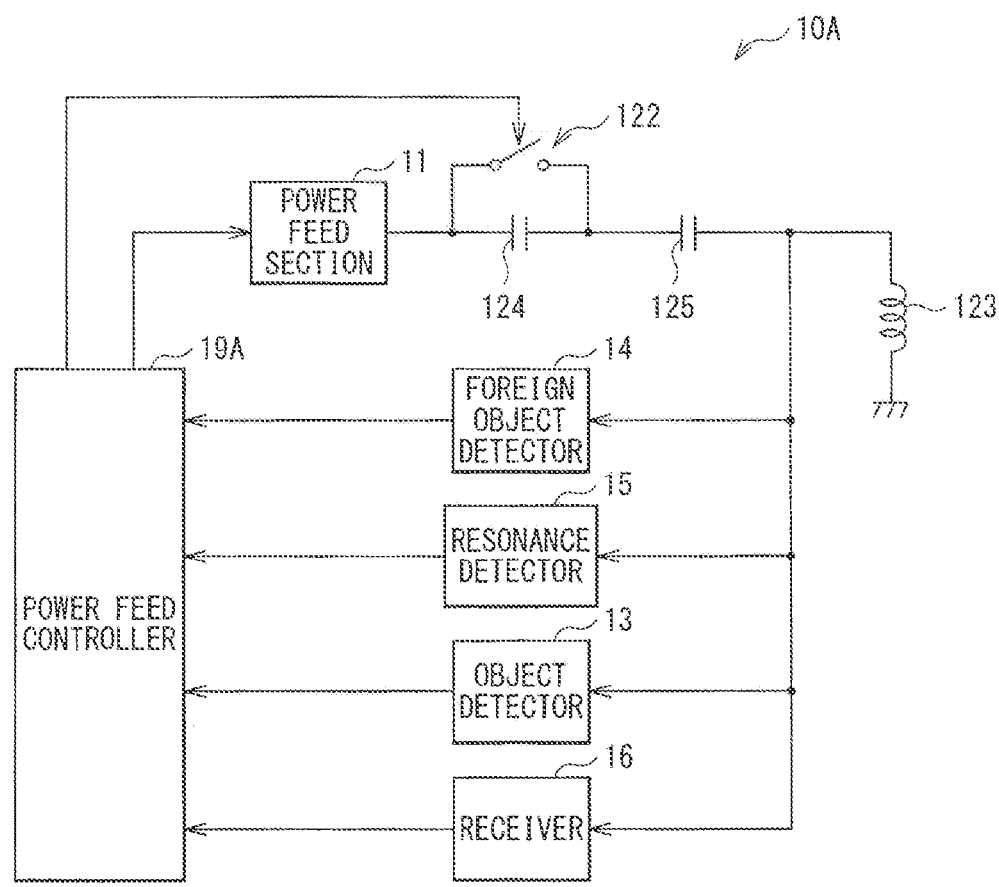

[ FIG. 16 ]
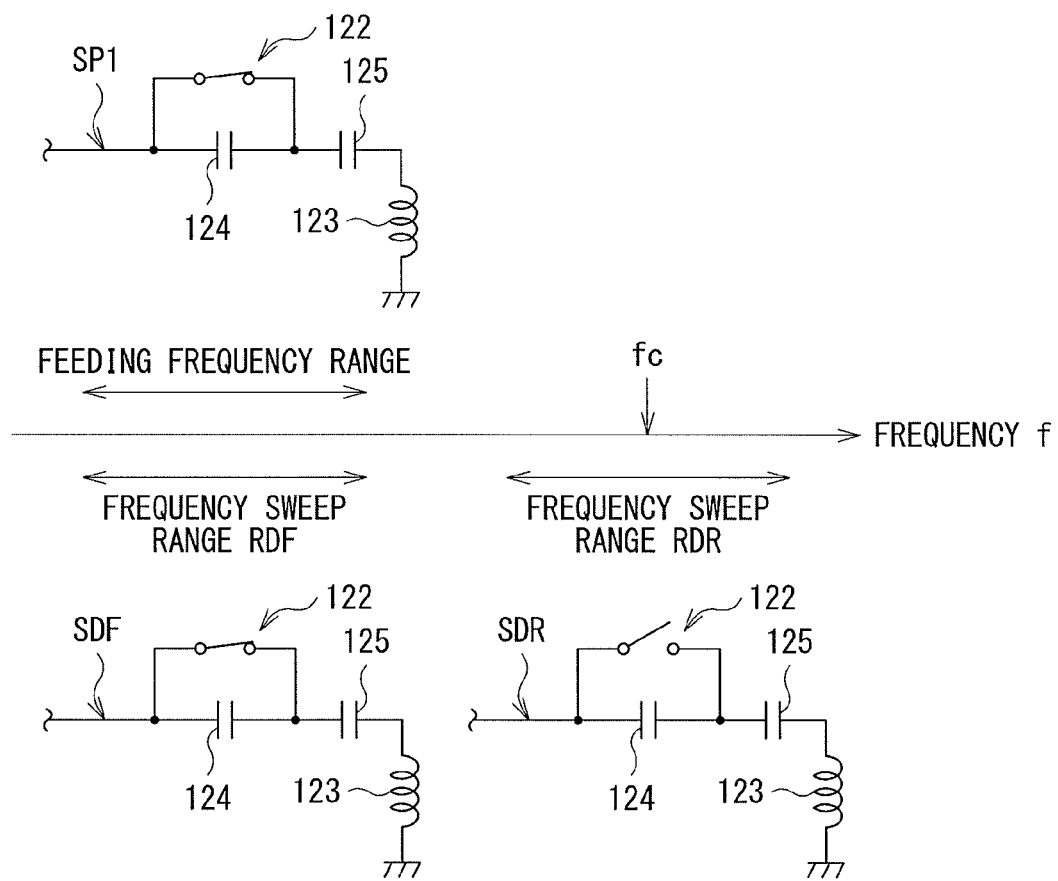

[ FIG. 17 ]
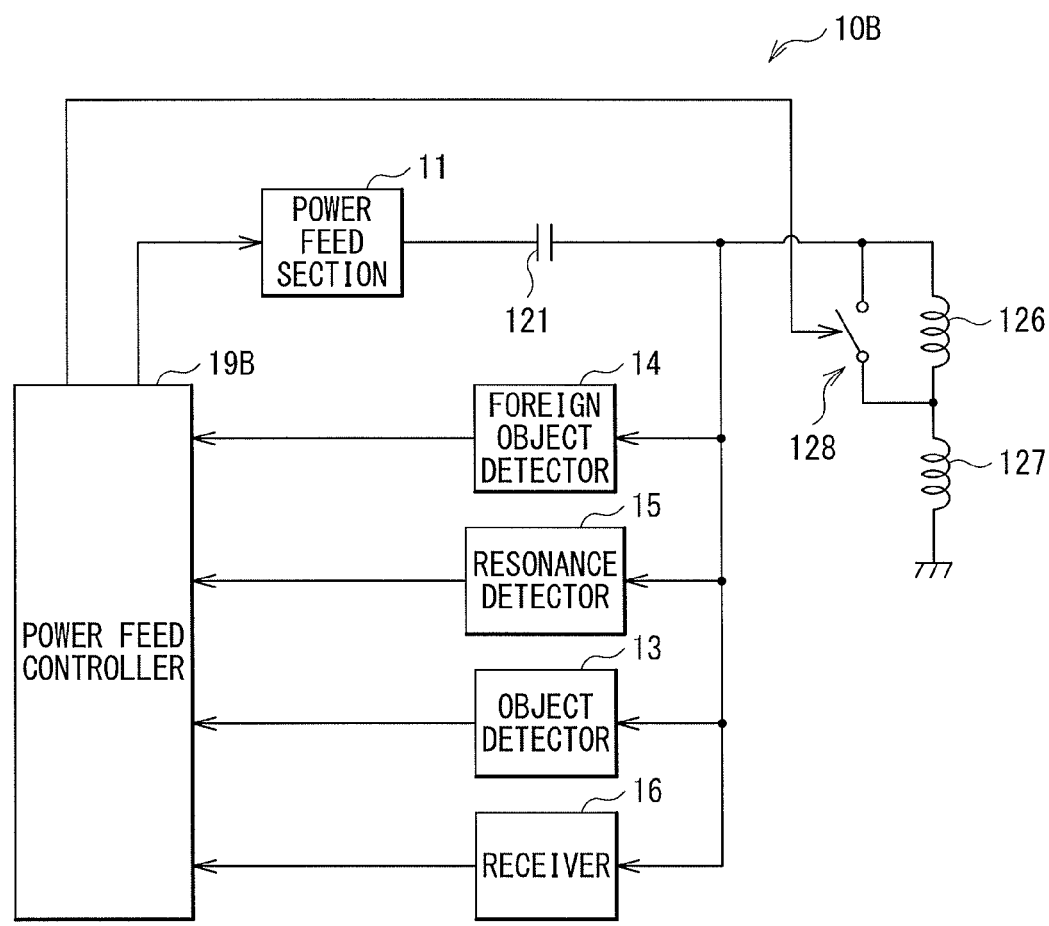

[ FIG. 18 ]
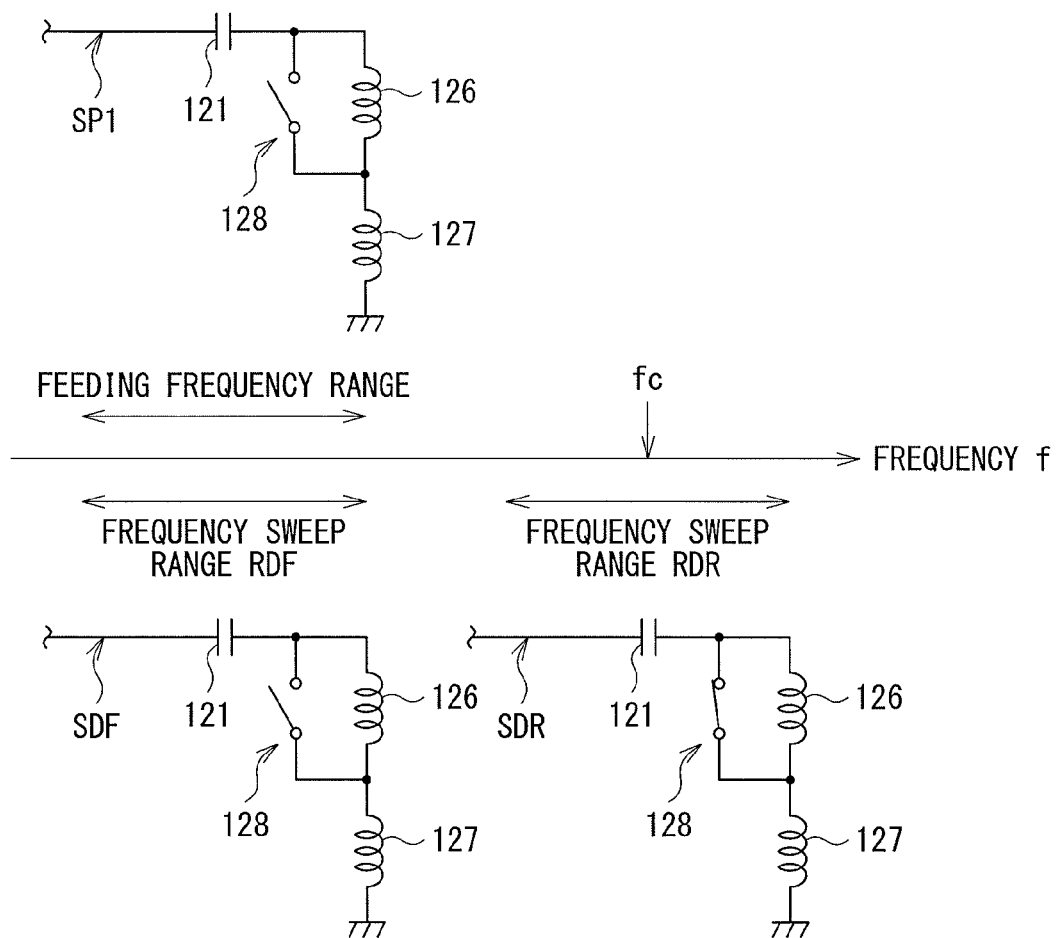

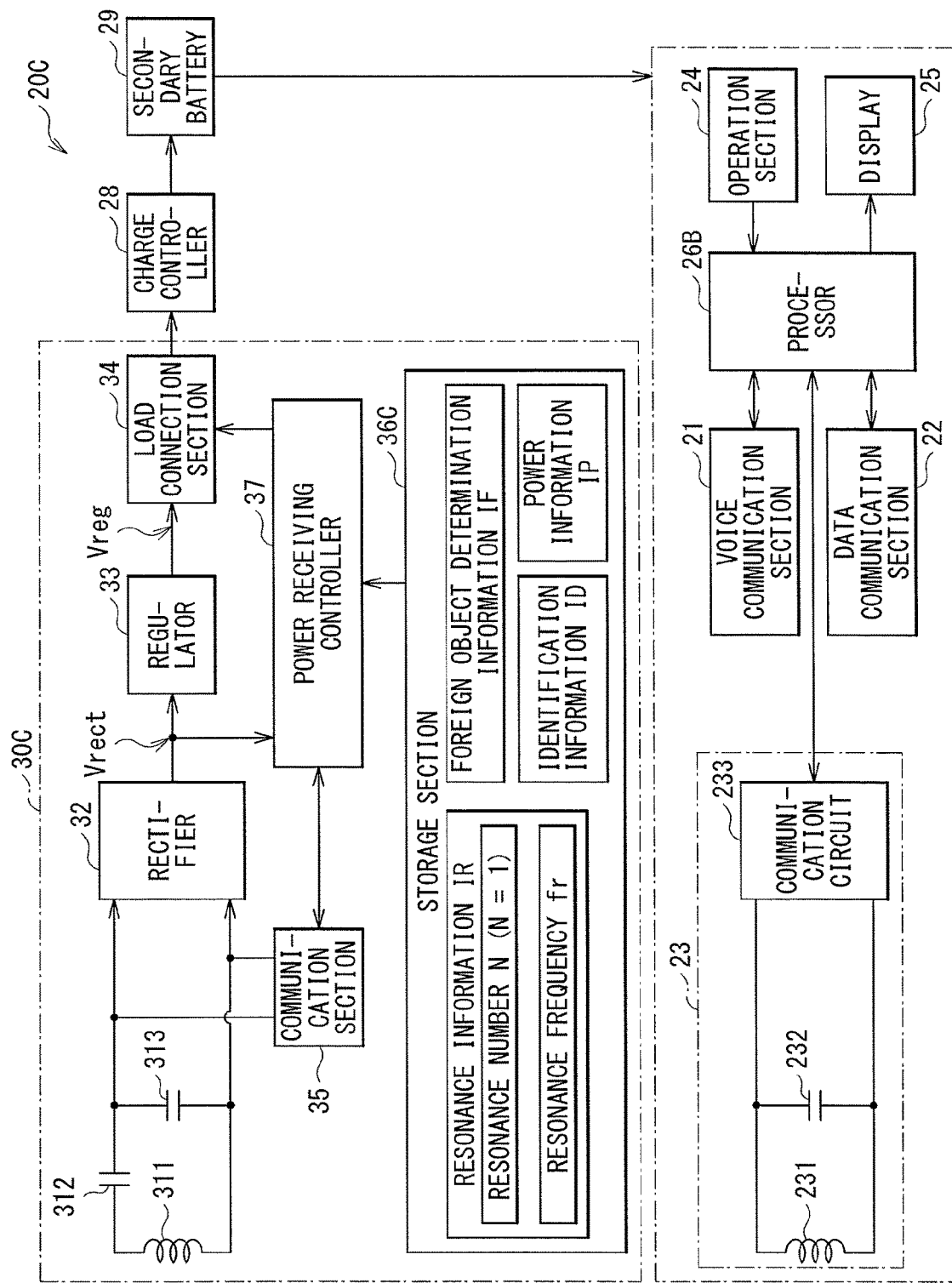
[FIG. 19]

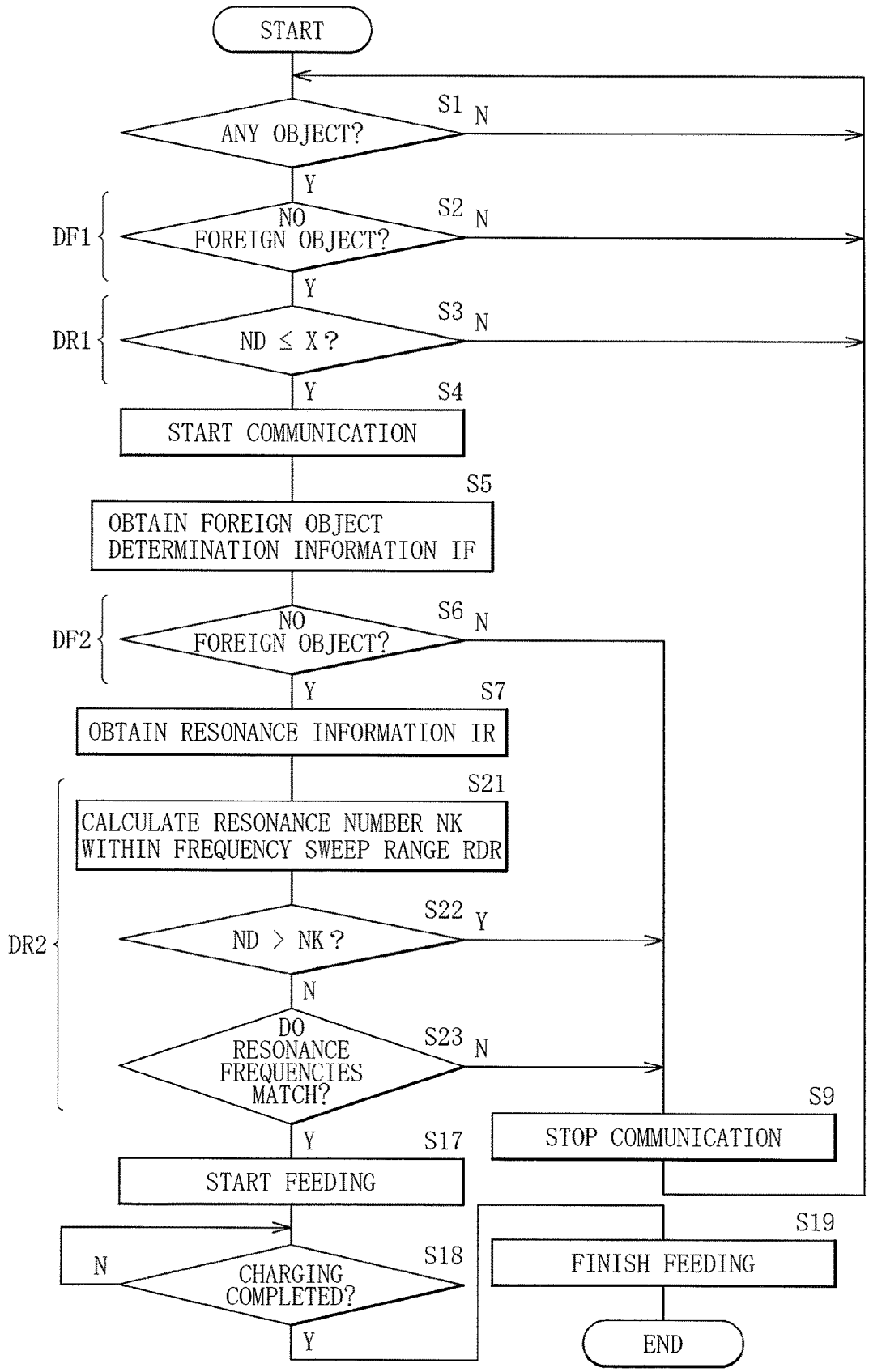
[FIG. 20]

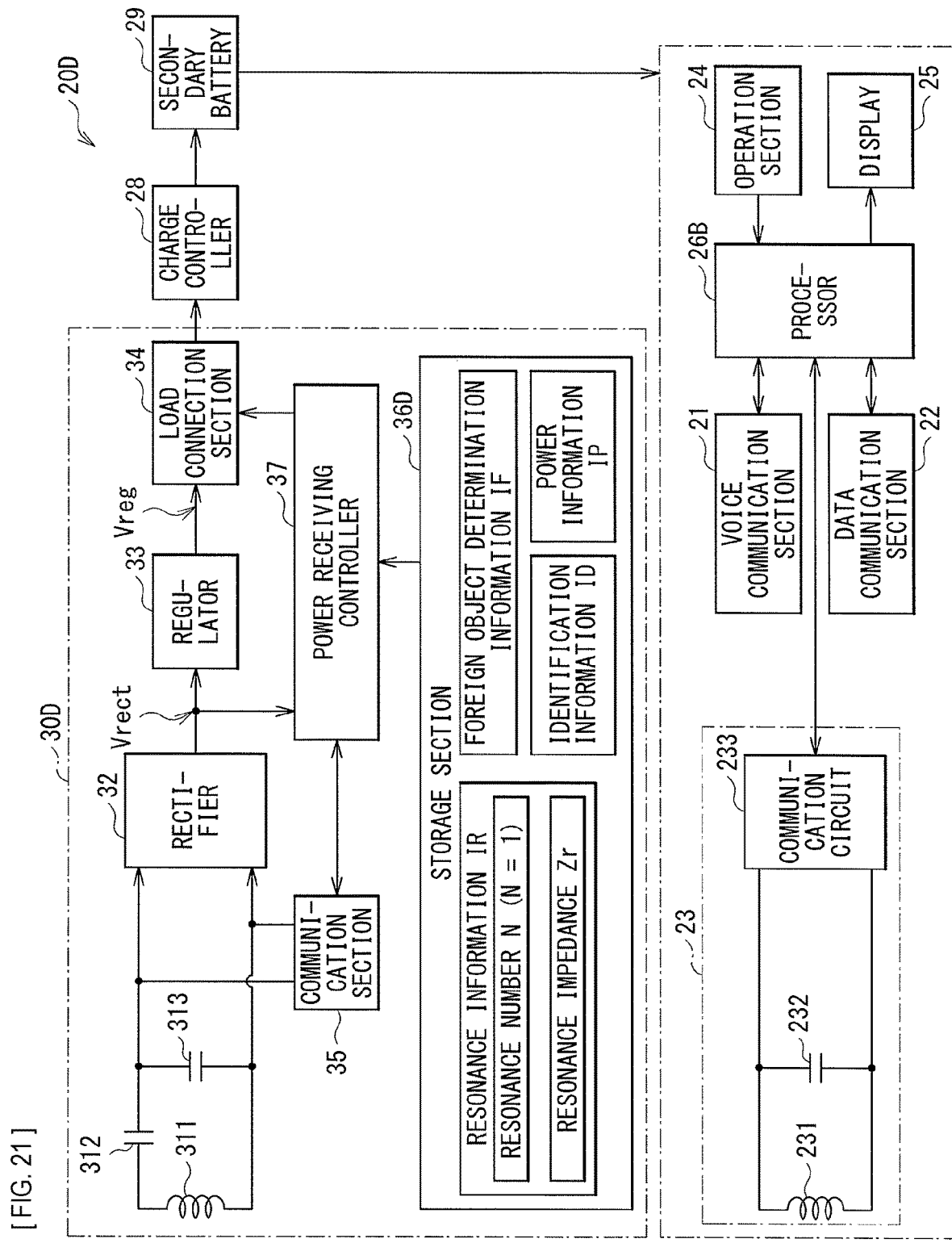
[FIG. 21]

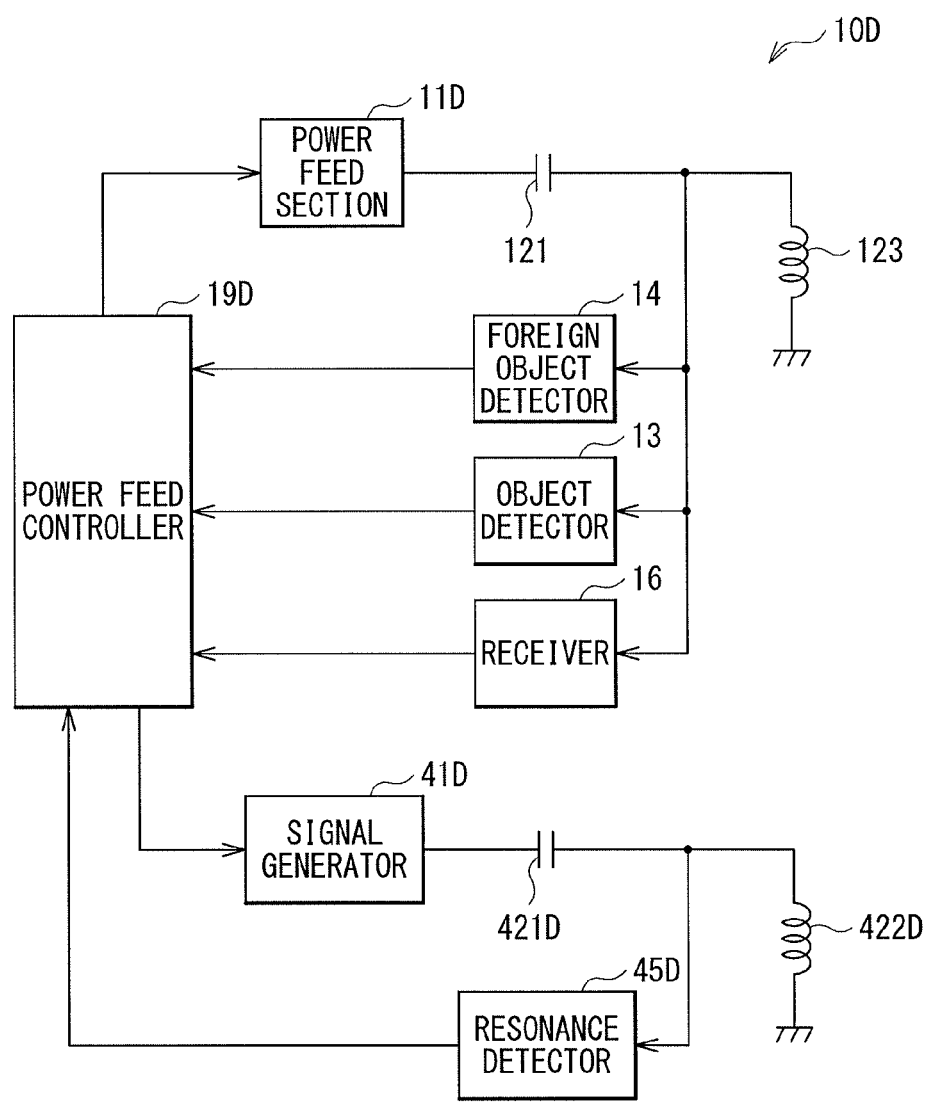
[ FIG. 22 ]

[ FIG. 23 ]
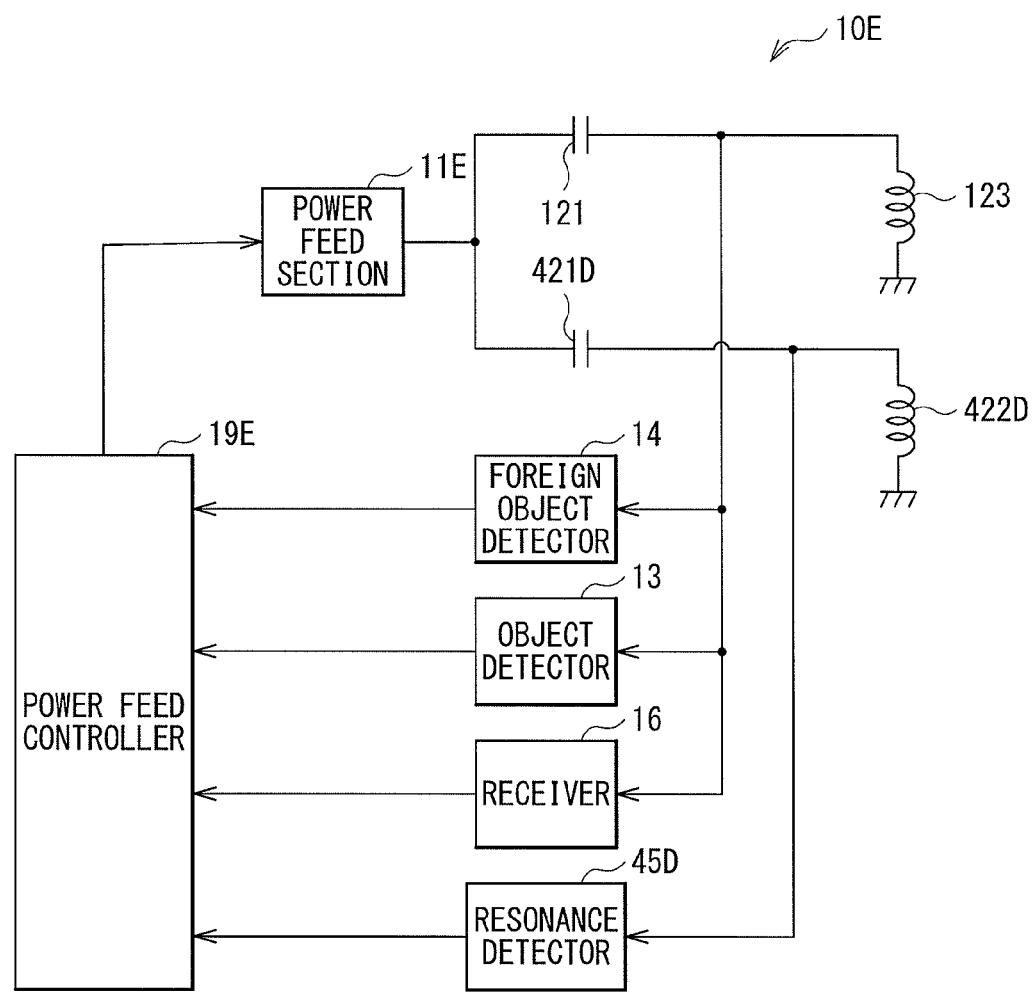

[FIG. 24]
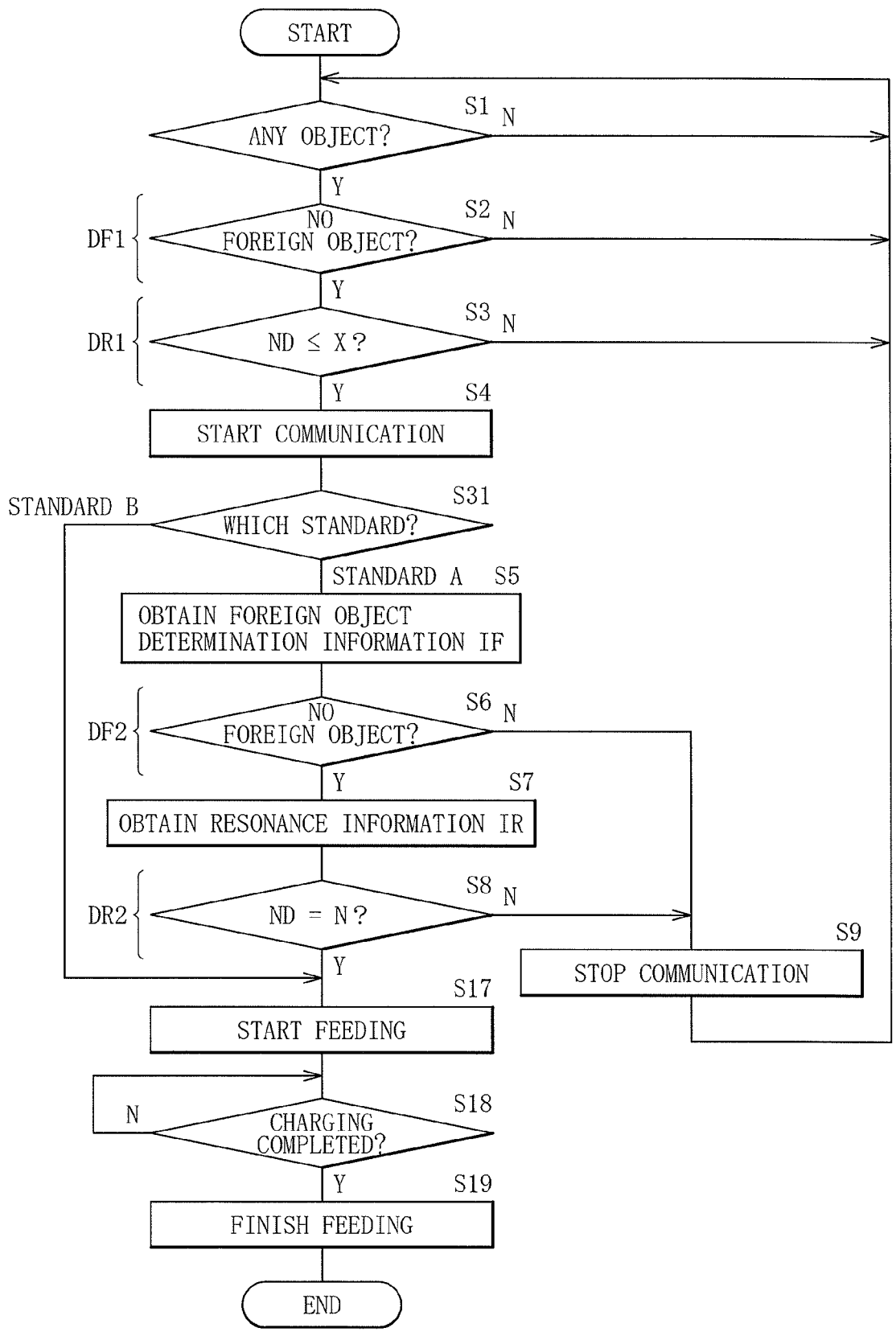

[ FIG. 25 ]
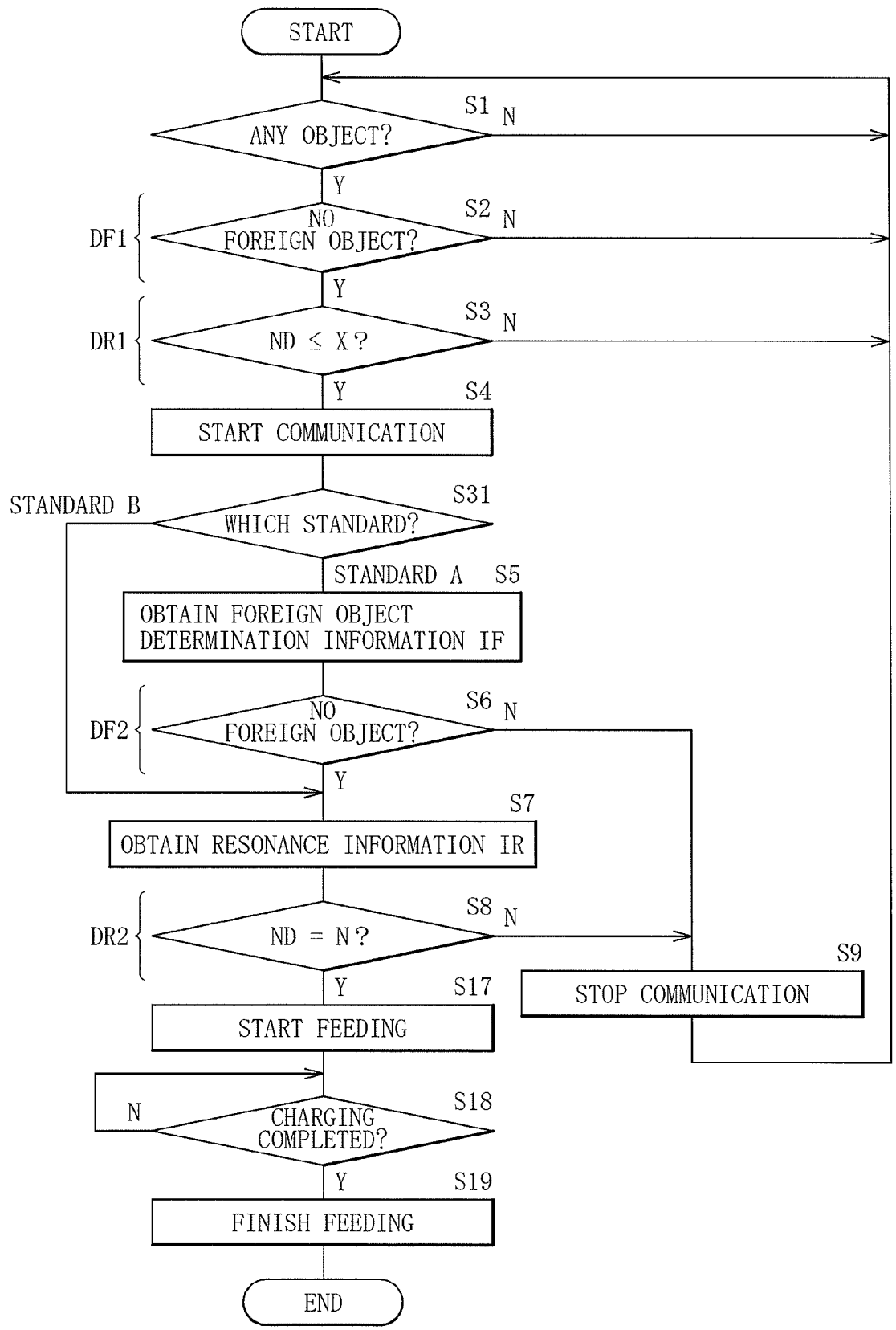

[FIG. 26]
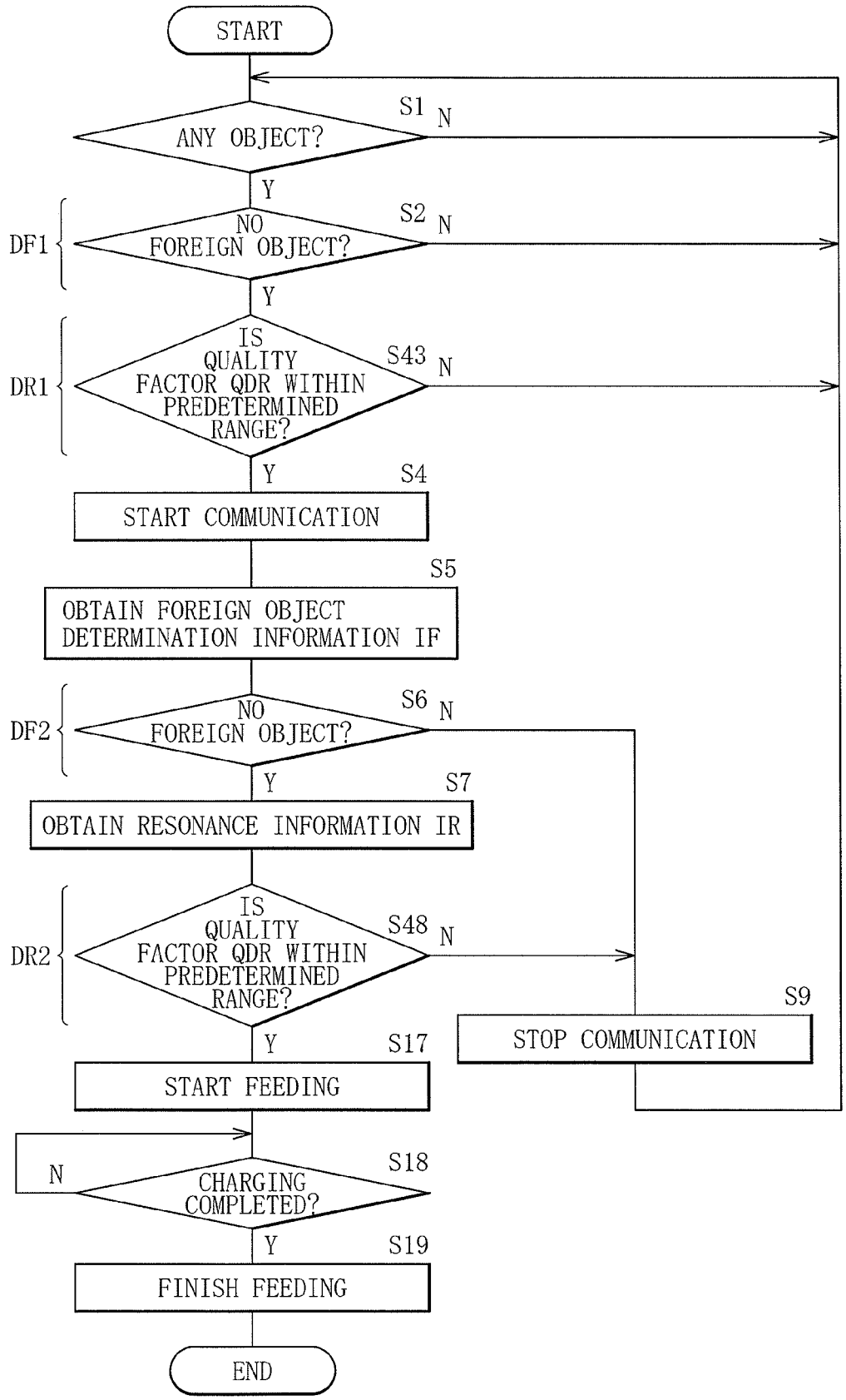

POWER RECEIVING DEVICE AND ELECTRONIC APPARATUS

TECHNICAL FIELD

The present disclosure relates to a power receiving device that receives power wirelessly from a power feed device, and to an electronic apparatus including such a power receiving device.

BACKGROUND ART

In recent years, for example, much attention has been focused on a power feed system that performs wireless feeding (also referred to as wireless power transfer, contact free, and contactless feeding) to a CE device (Consumer Electronics Device) such as a mobile phone and a portable audio player. Such a power feed system, for example, allows charging of a mobile phone through placing the mobile phone (power receiving device) on a power feed tray (power feed device). Examples of a method of performing such wireless feeding include an electromagnetic induction method and a magnetic resonance coupling method using a resonance phenomenon. The electromagnetic induction method and the magnetic resonance coupling method are often collectively referred to as a magnetic coupling method.

For example, such a magnetic-coupling power feed system has a possibility of generating heat and thereby decreasing safety if, during feeding, a foreign object such as a metallic piece is present between the power feed device and the power receiving device. Therefore, it is desired to detect a foreign object and control a feeding operation on the basis of a result of such detection. For example, PTL 1 to PTL 3 each disclose a power feed system that allows for detection of a foreign object.

CITATION LIST

Patent Literature

PTL 1: Japanese Unexamined Patent Application Publication No. 2015-46990
PTL 2: Japanese Unexamined Patent Application Publication No. 2013-27171
PTL 3: Japanese Unexamined Patent Application Publication No. 2013-27255

SUMMARY OF THE INVENTION

Thus, it is desired to increase safety in a power feed system, and further safety improvement is expected.

It is desirable to provide a power receiving device and an electronic apparatus that allow for an increase in safety.

A power receiving device according to an embodiment of the present disclosure includes a power receiving section and a communication section. The power receiving section receives power from a power feed device with use of a power receiving coil. The communication section transmits, to the power feed device, coil information indicating whether or not a coil is provided near the power receiving coil.

An electronic apparatus according to an embodiment of the present disclosure includes the above-described power receiving device.

In the power receiving device and the electronic apparatus according to the embodiments of the present disclosure, power is supplied from the power feed device with use of the power receiving coil. At the time, the coil information indicating whether or not the coil is provided near the power receiving coil is transmitted to the power feed device.

According to the power receiving device and the electronic apparatus in the embodiments of the present disclosure, the coil information indicating whether or not the coil is provided near the power receiving coil is transmitted to the power feed device, thus making it possible to increase safety. It is to be noted that the effects described here are not necessarily limitative, and may have any of the effects described in the present disclosure.

BRIEF DESCRIPTION OF DRAWINGS

FIG. 1 is a perspective view of a configuration example of a power feed system according to an embodiment of the present disclosure.
FIG. 2 is a block diagram illustrating a configuration example of a power feed device illustrated in FIG. 1.
FIG. 3 describes an operation example of the power feed device illustrated in FIG. 2.
FIG. 4A is a block diagram illustrating a configuration example of a smartphone illustrated in FIG. 1.
FIG. 4B is a block diagram illustrating a configuration example of another smartphone illustrated in FIG. 1.
FIG. 5 describes an example of arrangement of a power feed coil and a coil illustrated in FIG. 4B.
FIG. 6 describes another example of arrangement of the power feed coil and the coil illustrated in FIG. 4B.
FIG. 7 is a flowchart illustrating an operation example of the power feed system illustrated in FIG. 1.
FIG. 8 is a sequence diagram illustrating an example of a communication operation in the power feed system illustrated in FIG. 1.
FIG. 9 describes an operation example of the power feed system illustrated in FIG. 1.
FIG. 10 describes another operation example of the power feed system illustrated in FIG. 1.
FIG. 11A is a characteristic diagram illustrating an example of a characteristic in the operation example illustrated in FIG. 10.
FIG. 11B is another characteristic diagram illustrating an example of a characteristic in the operation example illustrated in FIG. 10.
FIG. 12 describes another operation example of the power feed system illustrated in FIG. 1.
FIG. 13 describes another operation example of the power feed system illustrated in FIG. 1.
FIG. 14A is a characteristic diagram illustrating an example of a characteristic in the operation example illustrated in FIG. 13.
FIG. 14B is another characteristic diagram illustrating an example of a characteristic in the operation example illustrated in FIG. 13.
FIG. 15 is a block diagram illustrating a configuration example of a power feed device according to a modification example.
FIG. 16 describes an operation example of the power feed device illustrated in FIG. 15.
FIG. 17 is a block diagram illustrating a configuration example of a power feed device according to another modification example.
FIG. 18 describes an operation example of the power feed device illustrated in FIG. 17.
FIG. 19 is a block diagram illustrating a configuration example of a smartphone according to another modification example.

FIG. 20 is a flowchart illustrating an operation example of a power feed system according to another modification example.

FIG. 21 is a block diagram illustrating a configuration example of a smartphone according to another modification example.

FIG. 22 is a block diagram illustrating a configuration example of a power feed device according to another modification example.

FIG. 23 is a block diagram illustrating a configuration example of a power feed device according to another modification example.

FIG. 24 is a flowchart illustrating an operation example of a power feed system according to another modification example.

FIG. 25 is a flowchart illustrating an operation example of the power feed system according to another modification example.

FIG. 26 is a flowchart illustrating an operation example of a power feed system according to another modification example.

MODES FOR CARRYING OUT THE INVENTION

In the following, some embodiments of the present disclosure are described in detail with reference to the drawings.

Embodiment

CONFIGURATION EXAMPLE

FIG. 1 illustrates a configuration example of a power feed system (power feed system 1) according to an embodiment. The power feed system 1 detects, prior to feeding, whether or not a foreign object such as a metallic piece, or an IC tag or IC card, or the like having a coil is caught between a power feed device and a power receiving device.

The power feed system 1 includes a power feed device 10 and a smartphone 20. The smartphone 20 includes a power receiving device 30. In this example, the power feed device 10 is a tray-type power feed device and makes it possible to supply power to the power receiving device 30 of the smartphone 20 through placing the smartphone 20 on a feeding surface of the power feed device 10, to charge a secondary battery 29 (described later).

A power feed coil 123 (described later) is provided on the feeding surface (a side to be in contact with the smartphone 20) of the power feed device 10. A power receiving coil 311 (described later) of the power receiving device 30 is provided on the power receiving surface (a side to be in contact with the power feed device 10) of the smartphone 20. The power feed device 10 supplies power to the power receiving device 30 of the smartphone 20 by electromagnetic induction via the power feed coil 123 and the power receiving coil 311. This allows a user to charge the secondary battery 29 without directly coupling an AC (Alternating Current) adopter or the like to the smartphone 20. As a result, this allows the power feed system 1 to increase user convenience.

In addition, as described later, the power feed device 10 has a function to detect, prior to performing actual feeding, whether or not a foreign object such as a metallic piece is present between the power feed device 10 and the power receiving device 30 (foreign object detections (FOD: Foreign Object Detection) DF1 and DF2). At the same time, the power feed device 10 also has a function to detect whether or not an IC tag, an IC card, or the like having a coil is present between the power feed device 10 and the power receiving device 30 (resonance detections DR1 and DR2). In other words, for example, in a case where a foreign object such as a metallic piece is present between the power feed device 10 and the power receiving device 30, there is a possibility that the metallic piece generates heat as a result of an eddy current flowing in the metallic piece during supply of power to the power receiving device 30 by the power feed device 10. In addition, for example, in a case where an IC tag is present between the power feed device 10 and the power receiving device 30, there is a possibility that the IC tag is destroyed by a high voltage that is generated due to an induced electromotive force generated in the coil of the IC tag during supply of power to the power receiving device 30 by the power feed device 10. Thus, the power feed device 10 performs the foreign object detections DF1 and DF2 and the resonance detections DR1 and DR2, and then starts the actual feeding after confirming that a foreign object such as a metal piece or an IC tag, an IC card, or the like having a coil is not present. This allows the power feed system 1 to increase safety.

It is to be noted that in this example, power is supplied to the smartphone 20, but this is not limitative. For example, it is possible to supply power to various electronic apparatuses such as a digital camera, a camcorder, a mobile phone, a smartphone, a mobile battery, a tablet, a digital book reader, and an audio player. In addition, in this example, the power feed device 10 performs feeding to one smartphone 20, but this is not limitative. Alternatively, feeding may be performed to two or more electronic apparatuses either simultaneously or by time division (serially).

(Power Feed Device 10)

FIG. 2 illustrates a configuration example of the power feed device 10. The power feed device 10 includes a power feed section 11, a capacitance element 121, a switch 122, a power feed coil 123, an object detector 13, a foreign object detector 14, a resonance detector 15, a receiver 16, and a power feed controller 19.

The power feed section 11 generates a power signal SP1 that is alternating current, on the basis of an instruction from the power feed controller 19. The power feed section 11 is supplied with alternating current power via a plug socket (what is called an outlet), or is supplied with either alternating current power or direct current power from another power supply device. Then, the power feed section 11 generates the power signal SP1 on the basis of the supplied power. The power signal SP1 has a frequency of about 100 kHz to several hundred kHz, for example.

In addition, the power feed section 11 also has a function to generate, in the foreign object detection DF1, an alternating-current signal SDF having lower power than the power signal SP1. At the time, the power feed section 11 sweeps a frequency of the alternating-current signal SDF across a predetermined frequency range (frequency sweep range RDF) that includes a frequency of the power signal SP1. It is to be noted that in this example, the frequency sweep range RDF includes the frequency of the power signal SP1, but this is not limitative. The frequency sweep range RDF may not include the frequency of the power signal SP1. In this case, it is desirable that the frequency sweep range RDF be close to the frequency of the power signal SP1.

In addition, the power feed section 11 also has a function to generate, in the resonance detection DR1, an alternating-current signal SDR having lower power than the power signal SP1. At the time, the power feed section 11 sweeps a frequency of the alternating-current signal SDR across a predetermined frequency range (frequency sweep range RDR) that includes a frequency fc (for example, 13.56 MHz) of a carrier wave used by the IC tag, the IC card, or the like. For example, the frequency sweep range RDR may include a higher frequency than a maximum frequency in the frequency sweep range RDF.

In addition, the power feed section 11 also has a function to transmit a feeding control signal CTL1 to the power receiving device 30. Specifically, in transmitting the feeding control signal CTL1, the power feed section 11 generates the power signal SP1 and also modulates the power signal SP1 in accordance with information to be transmitted. This allows a communication section 35 (described later) of the power receiving device 30 to receive the feeding control signal CTL1 on the basis of the modulated power signal.

The capacitance element 121 has one end coupled to one end of the switch 122 and the power feed section 11, and has the other end coupled to the other end of the switch 122 and one end of the power feed coil 123. The switch 122 has one end coupled to the one end of the capacitance element 121 and the power feed section 11, and has the other end coupled to the other end of the capacitance element 121 and the one end of the power feed coil 123. The switch 122 turns on and off on the basis of an instruction from the power feed controller 19. The power feed coil 123 is provided on the feeding surface of the power feed device 10 and has one end coupled to the other end of the capacitance element 121 and the other end of the switch 122, and has the other end grounded.

FIG. 3 schematically illustrates an operation example of the power feed section 11 and the switch 122. In a case where the power feed device 10 supplies power to the power receiving device 30, the switch 122 turns off in accordance with the instruction from the power feed controller 19. At this time, the capacitance element 121 and the power feed coil 123 are coupled in series to configure a resonant circuit. The resonant circuit has a resonance frequency around the frequency of the power signal SP1. Thereafter, the power feed section 11 supplies the power signal SP1 to the resonant circuit. This causes the power feed coil 123 to generate an electromagnetic field corresponding to the power signal SP1.

In addition, in a case where the power feed device 10 performs the foreign object detection DF1, the switch 122 turns off in accordance with the instruction from the power feed controller 19. At this time, the capacitance element 121 and the power feed coil 123 configure the resonant circuit. Thereafter, the power feed section 11 supplies the alternating-current signal SDF to the resonant circuit while sweeping the frequency of the alternating-current signal SDF across the frequency sweep range RDF. This causes the power feed coil 123 to generate an electromagnetic field corresponding to the alternating-current signal SDF.

In addition, in a case where the power feed device 10 performs the resonance detection DR1, the switch 122 turns on in accordance with the instruction from the power feed controller 19. At this time, the switch 122 short-circuits both ends of the capacitance element 121. Thereafter, the power feed section 11 supplies the alternating-current signal SDR to the power feed coil 123 while sweeping the frequency of the alternating-current signal SDR across the frequency sweep range RDR. This causes the power feed coil 123 to generate an electromagnetic field corresponding to the alternating-current signal SDR.

The object detector 13 detects, on the basis of a voltage at the one end of the power feed coil 123, whether or not an object (for example, the smartphone 20) is placed on the feeding surface of the power feed device 10. Specifically, for example, during a period in which the power feed section 11 generates the alternating-current signal, the object detector 13 detects a signal at the one end of the power feed coil 123. At this time, an amplitude or phase of the signal at the one end of the power feed coil 123 changes depending on whether or not the object is placed on the feeding surface of the power feed device 10. The object detector 13 detects whether or not an object is present through detecting the change in the amplitude or phase.

It is to be noted that in this example, the object detector 13 detects the object on the basis of the voltage at the one end of the power feed coil 123, but this is not limitative. The object may be detected on the basis of a voltage or current at another node. In addition, the method of detecting the object is not limited to this, and various methods that allow for detection of whether or not an object is present are applicable.

The foreign object detector 14 performs the foreign object detection DF1 on the basis of the voltage at the one end of the power feed coil 123. Specifically, during a period in which the power feed section 11 generates the alternating-current signal SDF, the foreign object detector 14 calculates a quality factor QD in the frequency sweep range RDF on the basis of the voltage at the one end of the power feed coil 123. The quality factor QD is associated with a quality factor of the resonant circuit including the power feed coil 123 and the capacitance element 121, and relates to feeding efficiency from the power feed device 10 to the power receiving device 30. The quality factor QD is a parameter that changes in accordance with a resistance value, an inductance value, a capacitance value, and frequency in the resonant circuit. In other words, the voltage value, feeding efficiency, charge efficiency, energy loss, the resistance value, the inductance value, the capacitance value, and frequency are parameters related to the quality factor. It is to be noted that in this example, the quality factor QD is the quality factor of the resonant circuit, but this is not limitative. The quality factor QD may be a quality factor of the power feed coil 123 itself. For example, in a case where a foreign object such as a metallic piece is present between the power feed device 10 and the power receiving device 30, the quality factor QD decreases due to a resistance component of the foreign object. The foreign object detector 14 detects whether or not a foreign object is present on the basis of the quality factor QD.

In addition, as described later, the foreign object detector 14 also has a function to perform, after the power feed device 10 and the power receiving device 30 start communication with each other, the foreign object detection DF2 on the basis of the quality factor QD and foreign object determination information IF (described later) transmitted from the power receiving device 30.

It is to be noted that in this example, the foreign object detector 14 performs the foreign object detection DF1 on the basis of the voltage at the one end of the power feed coil 123, but this is not limitative. The foreign object detector 14 may perform the foreign object detection DF1 on the basis of the voltage or current at another node.

The resonance detector 15 performs the resonance detection DR1 on the basis of the voltage at the one end of the power feed coil 123. Specifically, during a period in which the power feed section 11 generates the alternating-current signal SDR, the resonance detector 15 measures, on the basis of the voltage at the one end of the power feed coil 123, a frequency characteristic of an impedance (impedance characteristic ZDR) as viewed from the resonance detector 15, to calculate the number of resonant points (resonance number ND) in the frequency sweep range RDR on the basis of the impedance characteristic ZDR. For example, the resonance number ND changes in a case where an IC tag, an IC card, or the like having a coil is present between the power feed device 10 and the power receiving device 30. The resonance detector 15 detects whether or not an IC tag, an IC card, or the like is present, on the basis of the resonance number ND.

In addition, as described later, the resonance detector 15 also has a function to perform, after the power feed device 10 and the power receiving device 30 start communication with each other, the resonance detection DR2 on the basis of the resonance number ND and resonance information IR (described later) transmitted from the power receiving device 30.

It is to be noted that in this example, the resonance detector 15 performs the resonance detection DR1 on the basis of the voltage at one end of the power feed coil 123, but this is not limitative. The resonance detector 15 may perform the resonance detection DR1 on the basis of the voltage or current at another node.

The receiver 16 receives a feeding control signal CTL2 through performing communication with the power receiving device 30. The feeding control signal CTL2 includes information necessary for a feeding operation such as a request to the power feed device 10 for an increase or decrease in the feeding power. In addition, in this example, the feeding control signal CTL2 also includes information such as, as described later, identification information ID, power information IP, the foreign object determination information IF, and the resonance information IR. The receiver 16 receives the feeding control signal CTL2 on the basis of the voltage at the one end of the power feed coil 123. Specifically, first, during a period in which the power feed section 11 generates the power signal SP1, the communication section 35 (described later) of the power receiving device 30 changes a load as viewed from the power feed device 10 in accordance with information to be transmitted. This change in the load appears in the power feed device 10 as a change in the amplitude or phase of the voltage at the one end of the power feed coil 123, and as a change in amplitude or phase of a current flowing in the power feed coil 123. The receiver 16 detects these changes in the amplitude or phase, thereby receiving the feeding control signal CTL2 transmitted from the power receiving device 30. Thus, the power feed system 1 transmits the feeding control signal CTL2 by so-called load modulation.

It is to be noted that in this example, the receiver 16 receives the feeding control signal CTL2 on the basis of the voltage at one end of the power feed coil 123, but this is not limitative. The receiver 16 may receive the feeding control signal CTL2 on the basis of the voltage or current at another node.

The power feed controller 19 controls an operation in the power feed device 10. Specifically, in a case of detecting whether or not an object (such as the smartphone 20) is placed on the feeding surface of the power feed device 10, the power feed controller 19 performs control to cause the switch 122 to turn off, performs control to cause the power feed section 11 to generate the alternating-current signal, and performs control to cause the object detector 13 to detect whether or not an object is present.

In addition, in a case of performing the foreign object detection DF1, the power feed controller 19 performs control to cause the switch 122 to turn off, performs control to cause the power feed section 11 to generate the alternating-current signal SDF, and performs control to cause the foreign object detector 14 to detect whether or not a foreign object is present. In addition, in a case of performing the resonance detection DR1, the power feed controller 19 performs control to cause the switch 122 to turn on, performs control to cause the power feed section 11 to generate the alternating-current signal SDR, and performs control to cause the resonance detector 15 to detect whether or not an IC tag, an IC card, or the like is present.

In addition, in a case where the power feed device 10 performs the foreign object detection DF2, the power feed controller 19 performs control to cause the receiver 16 to receive the foreign object determination information IF (described later), and performs control to cause the foreign object detector 14 to detect, on the basis the foreign object determination information IF, whether or not a foreign object is present. In addition, in a case of performing the resonance detection DR2, the power feed controller 19 performs control to cause the receiver 16 to receive the resonance information IR (described later), and performs control to cause the resonance detector 15 to detect, on the basis of the resonance information IR, whether or not an IC tag, an IC card, or the like is present.

In addition, in a case of performing the actual feeding to the power receiving device 30, the power feed controller 19 performs control to cause the switch 122 to turn off, performs control to cause the receiver 16 to receive the feeding control signal CTL2 that includes information such as the request for an increase or decrease in the feeding power, and controls, on the basis of the request, the power of the power signal SP1 generated by the power feed section 11.

(Smartphone 20 and Power Receiving Device 30)

Next, the smartphone 20 is described. In the following, two smartphones 20A and 20B are described as examples. The smartphone 20A does not have a function to perform near field communication (NFC; Near Field Communication), and the smartphone 20B has a function to perform near field communication.

FIG. 4A illustrates a configuration example of the smartphone 20A. The smartphone 20A includes the power receiving device 30, a charge controller 28, the secondary battery 29, a voice communication section 21, a data communication section 22, an operation section 24, a display 25, and a processor 26A.

The power receiving device 30 includes the power receiving coil 311, capacitance elements 312 and 313, a rectifier 32, a regulator 33, a load connection section 34, the communication section 35, a storage section 36, and a power receiving controller 37.

The power receiving coil 311 is provided on the power receiving surface of the smartphone 20, and has one end coupled to a first input terminal of the rectifier 32 via the capacitance element 312, and the other end coupled to a second input terminal of the rectifier 32. Further, the capacitance element 313 is inserted between the first input terminal and the second input terminal of the rectifier 32. The power receiving coil 311 and the capacitance element 312 are coupled in series in such a manner to configure a resonant circuit. The resonant circuit has a resonance frequency around the frequency of the power signal SP1. Thus, on the basis of the electromagnetic field generated by the power feed coil 123 of the power feed device 10, the power receiving coil 311 generates an induced voltage corresponding to a change in a magnetic flux thereof, in accordance with the law of electromagnetic induction.

The circuit including the power receiving coil 311 and the capacitance elements 312 and 313 generates, during feeding, a power signal SP2 that is alternating current having a voltage corresponding to the induced voltage between both ends of the power receiving coil 311, and supplies the power signal SP2 to the rectifier 32. In other words, the power signal SP2 is generated on the basis of the power signal SP1 in the power feed device 10.

The rectifier 32 generates a direct-current signal having a power receiving voltage Vrect through rectifying the power signal SP2.

The regulator 33 generates direct current power having a voltage Vreg on the basis of the direct-current signal supplied from the rectifier 32. Thereafter, the regulator 33 supplies the voltage Vreg as power-supply voltage to respective blocks in the power receiving device 30, and also supplies the voltage Vreg to the charge controller 28 via the load connection section 34.

The load connection section 34 connects or disconnects the regulator 33 and the charge controller 28 from each other on the basis of the instruction from the power receiving controller 37.

The communication section 35 receives the feeding control signal CTL1 transmitted from the power feed device 10 and also transmits, to the power feed device 10, the feeding control signal CTL2 including information provided by the power receiving controller 37. Specifically, in a case of receiving the feeding control signal CTL1, the communication section 35 receives the feeding control signal CTL1 through performing demodulation processing on the modulated power signal SP2. In addition, in a case of transmitting the feeding control signal CTL2, during a period in which the power feed device 10 is transmitting the power signal SP1, the communication section 35 changes an impedance between the first input terminal and the second input terminal of the rectifier 32 in accordance with the information to be transmitted. The receiver 16 of the power feed device 10 receives the feeding control signal CTL2 through detecting the change in the impedance (load change).

The storage section 36 stores the information transmitted and received in the power feed system 1, and includes, for example, a nonvolatile memory. The storage section 36 stores the identification information ID, the power information IP, the foreign object determination information IF, and the resonance information IR. The identification information ID is information for identification of the power receiving device 30 and is, for example a so-called serial number. The power information IP is information indicating power (power class) that the power receiving device 30 is able to receive. The foreign object determination information IF is information used in a case where the foreign object detector 14 of the power feed device 10 performs the foreign object detection DF2, and includes, for example, a reference quality factor Q. The resonance information IR is information used in a case where the resonance detector 15 of the power feed device 10 performs the resonance detection DR2. In a case where, in the smartphone 20A, a coil is provided near the power receiving coil 311, the resonance information IR includes information regarding the number of resonant points (resonance number N) in the resonant circuit including the coil. The resonance number N is set to "0" in a case where no coil is provided near the power receiving coil 311. In other words, the resonance information IR also includes information regarding whether or not a coil is provided near the power receiving coil 311. In the smartphone 20A, no coil is provided near the power receiving coil 311. Thus, in this example, the resonance number N is set to "0" (N=0).

The power receiving controller 37 controls an operation in the power receiving device 30. Specifically, the power receiving controller 37 provides, to the communication section 35, the identification information ID, the power information IP, the foreign object determination information IF, and the resonance information IR, and performs control to cause the communication section 35 to transmit, to the power feed device 10, the feeding control signal CTL2 including these pieces of information. In addition, upon reception of the power supplied from the power feed device 10, the power receiving controller 37 provides, to the communication section 35, information regarding the request for an increase or decrease in the feeding power and so on, on the basis of the power receiving voltage Vrect, and performs control to cause the communication section 35 to transmit, to the power feed device 10, the feeding control signal CTL2 including these pieces of information. In addition, the power receiving controller 37 controls an operation of connecting or disconnecting the regulator 33 and the charge controller 28 from each other in the load connection section 34.

The charge controller 28 controls a charging operation in the secondary battery 29. The secondary battery 29 stores direct current power and includes, for example, a rechargeable battery such as a lithium-ion battery. The charge controller 28 and the secondary battery 29 supply power to various circuits and devices intended to realize functions of the smartphone 20 (in this example, the voice communication section 21, the data communication section 22, the operation section 24, the display 25, and the processor 26A).

The voice communication section 21 performs voice communication with mobile phone base stations. The data communication section 22 performs data communication using a wireless LAN (Local Area Network). The operation section 24 is a user interface used by the user to operate the smartphone 20A, and includes various types of buttons, a touch panel, etc. The display 25 displays a state of the smartphone 20A and results of various types of information processing. The processor 26A includes, for example, a CPU (Central Processing Unit), a RAM (Random Access Memory), a nonvolatile memory, etc., and performs, through executing programs, various types of information processing intended to realize the functions of the smartphone 20A.

FIG. 4B illustrates a configuration example of the smartphone 20B. The smartphone 20B includes the power receiving device 30, the charge controller 28, the secondary battery 29, the voice communication section 21, the data communication section 22, an NFC communication section 23, the operation section 24, the display 25, and a processor 26B. The smartphone 20B corresponds to the smartphone 20A (FIG. 4A) that includes the NFC communication section 23, and includes the processor 26B in place of the processor 26A.

FIGS. 5 and 6 each illustrate an example of arrangement of the power receiving coil 311 and the coil 231 in the smartphone 20B. In the smartphone 20B, the coil 231 is provided near the power receiving coil 311. In the example illustrated in FIG. 5, on the power receiving surface of the smartphone 20B, the power receiving coil 311 and the coil 231 are provided to be adjacent to each other. In the example illustrated in FIG. 6, on the power receiving surface of the smartphone 20B, the power receiving coil 311 and the coil 231 are arranged to have respective center points substantially coincident with each other. In this example, the power receiving coil 311 has a smaller coil diameter than the coil 231, and the power receiving coil 311 is therefore provided inside the coil 231.

FIGS. 5 and 6 each illustrate an example of arrangement of the power receiving coil 311 and the coil 231 in the smartphone 20B. In the smartphone 20B, the coil 231 is provided near the power receiving coil 311. In the example illustrated in FIG. 5, on the power receiving surface of the smartphone 20B, the power receiving coil 311 and the coil 231 are provided to be adjacent to each other. In the example illustrated in FIG. 6, on the power receiving surface of the smartphone 20B, the power receiving coil 311 and the coil 231 are arranged to have respective center points substantially coincident with each other. In this example, the power receiving coil 311 has a smaller coil diameter than the coil 231, and the power receiving coil 311 is therefore provided inside the coil 231.

As described above, in the smartphone 20B, the coil 231 is provided near the power receiving coil 311. The coil 231 configures a resonant circuit, and the resonant circuit has one resonant point. Thus, in the storage section 36 of the smartphone 20B, the resonance number N is set to "1" (N=1).

Here, the rectifier 32 and the regulator 33 correspond to a specific example of a "power receiving section" in the present disclosure. The communication section 35 corresponds to a specific example of a "communication section" in the present disclosure. The coil 231 corresponds to a specific example of a "coil" in the present disclosure. The resonance information IR corresponds to a specific example of "coil information" in the present disclosure. The foreign object determination information IF corresponds to a specific example of "power-receiving coil information" in the present disclosure.

[Workings and Effects]

Workings and effects of the power feed system 1 according to the present embodiment are subsequently described.

(Overview of Overall Operation)

First, an overview of an overall operation of the power feed system 1 is described with reference to FIGS. 2, 4A, and 4B. In the power feed device 10 (FIG. 2), on the basis of the instruction from the power feed controller 19, the power feed section 11 generates the power signal SP1 and the alternating-current signals SDF and SDR, and also transmits the feeding control signal CTL1 to the power receiving device 30. The switch 122 shot-circuits both ends of the capacitance element 121 on the basis of the instruction from the power feed controller 19. The power feed coil 123 generates the electromagnetic field on the basis of the power signal SP1 and the alternating-current signals SDF and SDR. The object detector 13 detects whether or not an object is placed on the feeding surface of the power feed device 10. The foreign object detector 14 detects whether or not a foreign object is present on the feeding surface of the power feed device 10 through performing the foreign object detections DF1 and DF2. The resonance detector 15 detects whether or not an IC tag, an IC card, or the like is present on the feeding surface of the power feed device 10 through performing the resonance detections DR1 and DR2. The receiver 16 receives the feeding control signal CTL2 transmitted from the power receiving device 30. The power feed controller 19 controls the operation in the power feed device 10.

In the power receiving device 30 (FIGS. 4A and 4B), the power receiving coil 311 generates, on the basis of the electromagnetic field generated by the power feed coil 123, an induced voltage corresponding to the change in the magnetic flux thereof. Thereafter, the power receiving coil 311 and the capacitance elements 312 and 313 supply, to the rectifier 32, the power signal SP2 corresponding to the power signal SP1. The rectifier 32 generates a direct-current signal having the power receiving voltage Vrect through rectifying the power signal SP2. The regulator 33 generates direct current power having the voltage Vreg on the basis of the direct-current signal supplied from the rectifier 32. The load connection section 34 connects the regulator 33 and the charge controller 28 on the basis of the instruction from the power receiving controller 37. The communication section 35 receives the feeding control signal CTL1 transmitted from the power feed device 10 and also transmits, to the power feed device 10, the feeding control signal CTL2 that includes the information provided by the power receiving controller 37. The storage section 36 stores the identification information ID, the power information IP, the foreign object determination information IF, and the resonance information IR. The power receiving controller 37 controls the operation in the power receiving device 30.

The charge controller 28 controls the charging operation in the secondary battery 29. The secondary battery 29 stores direct current power. The charge controller 28 and the secondary battery 29 supply power to various circuits and devices intended to realize the functions of the smartphone 20 (20A and 20B).

(Detailed Operation)

FIG. 7 illustrates a flowchart of a feeding operation in the power feed system 1. In the power feed system 1, the power feed device 10 performs the foreign object detection DF1 and the resonance detection DR1, and subsequently starts communication with the power receiving device 30. Thereafter, the power feed device 10 performs the foreign object detection DF2 and the resonance detection DR2, and subsequently starts the actual feeding to the power receiving device 30. In the following, the details are described.

First, the power feed device 10 detects whether or not an object (for example, the smartphone 20) is placed on the feeding surface of the power feed device 10 (step S1). Specifically, for example, the power feed controller 19 turns off the switch 122, the power feed section 11 generates the alternating-current signal, and the object detector 13 detects whether or not an object is present. In a case where no object is present ("N" in the step S1), a flow of the operation returns to step S1 and the step S1 is repeated until an object is detected.

In the step S1, in a case where an object is detected ("Y" in the step S1), the power feed device 10 performs the foreign object detection DF1 (step S2). Specifically, first, the power feed controller 19 turns off the switch 122, and the power feed section 11 generates the alternating-current signal SDF. At the time, the power feed section 11 sweeps the frequency of the alternating-current signal SDF across the frequency sweep range RDF. Thereafter, the foreign object detector 14 calculates the quality factor QD in the frequency sweep range RDF. Thereafter, in a case where the calculated quality factor QD is not within a predetermined range, the foreign object detector 14 determines that a foreign object is present ("N" in the step S2), and the flow returns to the step S1. In other words, in this case, the power feed device 10 determines that feeding is not supposed to be performed due to presence of the foreign object. In addition, in a case where the calculated quality factor QD is within the predetermined range, the foreign object detector 14 determines that no foreign object is present.

In the step S2, in a case where no foreign object is present ("Y" in the step S2), the power feed device 10 performs the resonance detection DR1 (step S3). Specifically, first, the power feed controller 19 turns on the switch 122, and the power feed section 11 generates the alternating-current signal SDR. At the time, the power feed section 11 sweeps the frequency of the alternating-current signal SDR across the frequency sweep range RDR. Thereafter, the resonance detector 15 measures the frequency characteristic of the impedance (the impedance characteristic ZDR) as viewed from the resonance detector 15 in the frequency sweep range RDR, and calculates the number of resonant points (the resonance number ND) in the frequency sweep range RDR on the basis of the impedance characteristic ZDR. Thereafter, the resonance detector 15 confirms whether or not the resonance number ND is equal to or smaller than a predetermined threshold X (ND≤X). The predetermined threshold X is set to "1" in this example. In a case where the resonance number ND is larger than the predetermined threshold X ("N" in the step S3), the power feed device 10 determines that an IC tag, an IC card, or the like is present, and the flow returns to the step S1. In other words, in this case, the power feed device 10 determines that feeding is not supposed to be performed due to presence of the IC tag, the IC card, or the like.

In the step S3, in a case where the resonance number ND is equal to or smaller than the predetermined threshold X ("Y" in the step S3), the power feed device 10 starts communication with the power receiving device 30 (step S4). Specifically, first, the power feed controller 19 turns off the switch 122, and the power feed section 11 generates the power signal SP1. At the time, the power feed section 11 supplies, to the power receiving device 30, small power that is sufficient to operate the power receiving device 30. In the power receiving device 30, the rectifier 32 generates the power receiving voltage Vrect on the basis of the power signal SP2, and the regulator 33 generates the voltage Vreg on the basis of the power receiving voltage Vrect. Thereafter, respective blocks of the power receiving device 30 start operating with the voltage Vreg as power-supply voltage. Thereafter, the power feed section 11 of the power feed device 10 transmits the feeding control signal CTL1 to the power receiving device 30, and the communication section 35 of the power receiving device 30 transmits the feeding control signal CTL2 to the power feed device 10.

Next, the power feed device 10 obtains the foreign object determination information IF from the power receiving device 30 (step S5). Specifically, the power receiving controller 37 of the power receiving device 30 reads the foreign object determination information IF from the storage section 36, and the communication section 35 transmits, to the power feed device 10, the feeding control signal CTL2 that includes the foreign object determination information IF, on the basis of the instruction from the power receiving controller 37. Thereafter, the receiver 16 of the power feed device 10 receives the feeding control signal CTL2.

Next, the power feed device 10 performs the foreign object detection DF2 (step S6). Specifically, the foreign object detector 14 compares the quality factor QD calculated in the foreign object detection DF1 (the step S2) and the reference quality factor Q included in the foreign object determination information IF obtained in the step S5. Thereafter, in a case where the quality factor QD is not within a predetermined range that is set on the basis of the reference quality factor Q, the foreign object detector 14 determines that a foreign object is present ("N" in the step S6). In this case, the power feed device 10 stops communication with the power receiving device 30 (step S9), and the flow returns to step S1. In other words, in this case, the power feed device 10 determines that feeding is not supposed to be performed due to presence of the foreign object. In addition, in a case where the quality factor QD is within the predetermined range that is set on the basis of the reference quality factor Q, the foreign object detector 14 determines that no foreign object is present.

In the step S6, in a case where no foreign object is present ("Y" in the step S6), the power feed device 10 obtains the resonance information IR from the power receiving device 30 (step S7). Specifically, the power receiving controller 37 of the power receiving device 30 reads the resonance information IR from the storage section 36, and the communication section 35 transmits, to the power feed device 10, the feeding control signal CTL2 that includes the resonance information IR, on the basis of the instruction from the power receiving controller 37. Thereafter, the receiver 16 of the power feed device 10 receives the feeding control signal CTL2.

Next, the power feed device 10 performs the resonance detection DR2 (step S8). Specifically, the resonance detector 15 compares the resonance number ND calculated in the resonance detection DR1 (the step S3) and the resonance number N that is included in the resonance information IR obtained in the step S7. Thereafter, in a case where the resonance number ND does not match the resonance number N ("N" in the step S8), the resonance detector 15 determines that an IC tag, an IC card, or the like is present. In this case, the power feed device 10 stops communication with the power receiving device 30 (the step S9), and the flow returns to step S1. In other words, in this case, the power feed device 10 determines that feeding is not supposed to be performed due to presence of the IC tag, the IC card, or the like.

In the step S8, in a case where the resonance number ND matches the resonance number N ("Y" in the step S8), the power feed device 10 starts the actual feeding to the power receiving device 30 (step S17). Specifically, first, the power receiving controller 37 issues, to the power feed device 10, the request for an increase or decrease in the feeding power and so on with use of the feeding control signal CTL2, and performs control to cause the power receiving voltage Vrect to reach a target voltage. Thereafter, the load connection section 34 connects the regulator 33 and the charge controller 28 on the basis of the instruction from the power receiving controller 37. This causes the power receiving device 30 to start charging the secondary battery 29 via the charge controller 28.

Next, the power receiving device 30 determines whether or not the charging of the secondary battery 29 is completed (step S18). Specifically, for example, the power receiving controller 37 determines whether or not the charging of the secondary battery 29 is completed, on the basis of the voltage at the secondary battery 29 or the current supplied to the secondary battery 29. In a case where the charging of the secondary battery 29 is not yet completed ("N" in the step S18), the flow returns to the step S18. Then, the step S18 is repeated until the charging is completed.

Thereafter, in the step S18, in a case where the charging of the secondary battery is completed ("Y" in the step S18), the power feed device 10 stops the feeding to the power receiving device 30 (step S19). Specifically, the load connection section 34 disconnects the regulator 33 and the charge controller 28 from each other on the basis of the instruction from the power receiving controller 37. In addition, the power receiving controller 37 issues, to the power feed device 10, a request to stop the feeding with use of the feeding control signal CTL2. Thereafter, on the basis of the request to stop the feeding, the power feed controller 19 of the power feed device 10 controls the operation of the power feed section 11 to stop generation of the power signal SP1.

This is the end of the flow.

FIG. 8 illustrates a sequence diagram of a communication operation in the power feed system 1. The communication operation is performed in a period from start of communication in the step S4 to start of the actual feeding in the step S17 in FIG. 7.

First, after starting the communication, the power feed device 10 transmits a start-up signal to the power receiving device 30 (step S101). The power receiving device 30 starts up in accordance with the start-up signal (step S102). Next, the power receiving device 30 transmits, to the power feed device 10, the feeding control signal CTL2 including the identification information ID and the power information IP that are stored in the storage section 36 (step S103). Thereafter, the power feed device 10 transmits, to the power receiving device 30, a response signal indicating that the power feed device 10 has received these pieces of information (step S104). This operation from the steps S101 to S104 corresponds to the operation in the step S4 in FIG. 7.

Next, the power receiving device 30 transmits, to the power feed device 10, the feeding control signal CTL2 including the foreign object determination information IF (step S105). The power feed device 10 performs the foreign object detection DF2 using the reference quality factor Q included in the foreign object determination information IF (step S106), and informs the power receiving device 30 of a result of the detection including a result as to whether or not a foreign object is present (step S107). This operation in the steps S105 to S107 corresponds to the operation in the steps S5 and S6 in FIG. 7.

Next, the power receiving device 30 transmits, to the power feed device 10, the feeding control signal CTL2 including the resonance information IR (step S108). The power feed device 10 performs the resonance detection DR2 using the resonance number N included in the resonance information IR (step S109), and informs the power receiving device 30 of a result of the detection including a result as to whether or not an IC tag, an IC card, or the like is present (step S110). In other words, this detection result indicates whether or not to supply power to the power receiving device 30. This operation in the steps S108 to S110 corresponds to the operation in the steps S7 and S8 in FIG. 7.

As described above, the power feed system 1 performs the resonance detections DR1 and DR2 in addition to the foreign object detections DF1 and DF2, thus making it possible to increase safety. In other words, for example, in a case where an IC tag, an IC card, or the like is present between the power feed device 10 and the smartphone 20, there is a possibility of being unable to detect any of these objects by the foreign object detections DF1 and DF2. The power feed system 1 performs the resonance detections DR1 and DR2 in addition to the foreign object detections DF1 and DF2, thus making it possible to increase detectability of the IC tag, the IC card, or the like. As a result, it is possible to reduce a possibility of destruction of the IC tag, the IC card, or the like, thus making it possible to increase safety.

In addition, after performing the foreign object detection DF1 using the alternating-current signal SDF having a low frequency, the power feed system 1 performs the resonance detection DR1 using the alternating-current signal SDR having a high frequency, thus making it possible to prevent the IC tag or IC card or the like from destruction.

In addition, in the resonance detection DR1, the power feed system 1 uses the alternating-current signal SDR having lower power than the power signal SP1, to allow for suppression of the power supplied to the IC tag, the IC card, or the like, thus making it possible to make the IC tag, the IC card, or the like resistant to destruction.

In addition, in the power feed system 1, the switch 122 is turned on in the resonance detection DR1, which makes it possible to increase detectability of the IC tag, the IC card, or the like. In other words, in a case where the switch 122 is turned off, the capacitance element 121 and the power feed coil 123 configure the resonant circuit, and the resonant circuit has a resonance frequency of about several hundred kHz. Thus, the alternating-current signal SDR has a frequency sufficiently higher than the resonance frequency, thus causing attenuation in the alternating-current signal SDR. In contrast, in the power feed system 1, the switch 122 is turned on in the resonance detection DR1, and therefore the power feed coil 123 does not configure the resonant circuit. As a result, it is possible to reduce a possibility of attenuation in the alternating-current signal SDR, thus making it possible to increase detectability of the IC tag, the IC card, or the like.

In addition, the power feed system 1 performs the resonance detection DR2 using the resonance information IR provided by the smartphone 20 that is a target to be supplied with power, thus making it possible to increase detection accuracy in detecting the IC tag, the IC card, or the like, as described below.

In addition, the power feed system 1 performs the resonance detection DR2, using the resonance information IR provided by the smartphone 20 that is a feeding target, thus making it possible to increase detection accuracy in detecting the IC tag or IC card or the like as described below.

Next, operations of the resonance detections DR1 and DR2 are described with reference to some specific operation examples.

Operation Example E1

FIG. 9 illustrates Operation Example E1. In this example, the smartphone 20A is placed on the feeding surface of the power feed device 10. In the resonance detection DR1 (the step S3 in FIG. 7), the power feed device 10 measures the impedance characteristic ZDR in the frequency sweep range RDR, and calculates the number of resonant points (resonance number ND) in the frequency sweep range RDR on the basis of the impedance characteristic ZDR. In the resonance detection DR1, the power feed coil 123 of the power feed device 10 does not configure the resonant circuit. In addition, the smartphone 20A does not have a coil near the power receiving coil 311. Thus, the resonant point does not appear in the impedance characteristic ZDR in the frequency sweep range RDR, and the resonance number ND is "0". The resonance number ND is equal to or smaller than the predetermined threshold X ("1" in this example). Thus, in the resonance detection DR1, the resonance detector 15 determines that an IC tag, an IC card, or the like is not present.

In the resonance detection DR2 (the step S8 in FIG. 7), the power feed device 10 confirms whether or not the resonance number ND calculated in the resonance detection DR1 is equal to the resonance number N included in the resonance information IR provided by the power receiving device 30. In the smartphone 20A, the resonance number N is "0" (N=0), and therefore the resonance number ND matches the resonance number N. Thus, in the resonance detection DR2, the resonance detector 15 determines that an IC tag, an IC card, or the like is not present.

In this manner, in Operation Example E1, it is determined an IC tag, an IC card, or the like is not present, and therefore the power feed device 10 performs the actual feeding to the power receiving device 30.

Operation Example E2

FIG. 10 illustrates Operation Example E2. In this example, an IC card 9 is inserted between the power feed device 10 and the smartphone 20A. The IC card 9 has a coil 91. The coil 91 configures a resonant circuit having one resonant point. Thus, one resonant point caused by the resonant circuit appears in the impedance characteristic ZDR in the frequency sweep range RDR.

FIGS. 11A and 11B each illustrate an example of the impedance characteristic ZDR in Operation Example E2, using a scattering parameter S11. FIG. 11A illustrates a characteristic of the scattering parameter S11 in a Smith chart form. In this example, as illustrated in FIG. 11A, a circular impedance locus is caused by the resonant circuit of the IC card 9, with one resonant point appearing near 13.56 MHz.

In the resonance detection DR1, the power feed device 10 calculates the resonance number ND on the basis of the impedance characteristic ZDR as described above. In this example, the resonance number ND is "1". This resonance number ND is equal to or smaller than the predetermined threshold X. Thus, in the resonance detection DR1, the resonance detector 15 determines that an IC tag, an IC card, or the like is not present.

However, in the smartphone 20A, the resonance number N is "0" (N=0). Thus, the resonance number ND does not match the resonance number N. As a result, in the resonance detection DR2, the resonance detector 15 determines that an IC tag, an IC card, or the like is present.

In this manner, in Operation Example E2, it is determined that an IC tag, an IC card, or the like is present, and therefore the power feed device 10 does not perform the actual feeding to the power receiving device 30.

Operation Example E3

FIG. 12 illustrates Operation Example E3. In this example, the smartphone 20B is placed on the feeding surface of the power feed device 10. In the smartphone 20B, the power receiving coil 311 and the coil 231 are arranged to have respective center points substantially coincident with each other. The coil 231 configures a resonant circuit having one resonant point. Thus, as in the case of Operation Example E2, one resonant point appears in the impedance characteristic ZDR in the frequency sweep range RDR, and the resonance number ND is "1". This resonance number ND is equal to or smaller than the predetermined threshold X. Thus, in the resonance detection DR1, the resonance detector 15 determines that an IC tag, an IC card, or the like is not present.

In addition, in the smartphone 20B, the resonance number N is "1" (N=1). Thus, the resonance number ND matches the resonance number N. As a result, in the resonance detection DR2, the resonance detector 15 determines that an IC tag, an IC card, or the like is not present.

In this manner, in Operation Example E3, it is determined that an IC tag, an IC card, or the like is not present, and therefore the power feed device 10 performs the actual feeding to the power receiving device 30.

Operation Example E4

FIG. 13 illustrates Operation Example E4. In this example, the IC card 9 is inserted between the power feed device 10 and the smartphone 20B. In this case, two resonant points appear in the impedance characteristic ZDR in the frequency sweep range RDR.

FIGS. 14A and 14B each illustrate an example of the impedance characteristic ZDR in Operation Example E4, using the scattering parameter S11. In this example, as illustrated in FIG. 14A, an impedance locus corresponding to the two resonant points is caused by the resonant circuit of the IC card 9 and the resonant circuit including the coil 231 of the smartphone 20B.

In the resonance detection DR1, the power feed device 10 calculates the resonance number ND on the basis of the impedance characteristic ZDR as described above. In this example, the resonance number ND is "2". This resonance number ND is larger than the predetermined threshold X. Thus, in the resonance detection DR1, the resonance detector 15 determines that an IC tag, an IC card, or the like is present.

In this manner, in Operation Example E4, it is determined that an IC tag, an IC card, or the like is present, and therefore the power feed device 10 does not perform the actual feeding to the power receiving device 30.

As described above, the power feed system 1 performs the resonance detection DR2 using the resonance information IR provided by the smartphone 20 that is the target to be supplied with power, thus making it possible to increase detection accuracy in detecting the IC tag, the IC card, or the like. In other words, for example, both in Operation Example E2 (FIG. 10) and Operation Example E3 (FIG. 12), the power feed device 10 detects one resonant point in the resonance detection DR1. Of these, Operation Example E3 (FIG. 12) is an example in which feeding is supposed to be performed, and Operation Example E2 (FIG. 10) is an example in which feeding is not supposed to be performed because the IC card 9 is inserted. In the power feed system 1, the power feed device 10 receives, from the power receiving device 30, the resonance information IR including the information regarding the resonance number N, and performs the resonance detection DR2 using the resonance number N. In Operation Example E2, the power feed device 10 determines that the detected resonant point is caused by the IC tag, the IC card, or the like because the resonance number ND and the resonance number N do not match each other, to determine that feeding is not supposed to be performed. In addition, in Operation Example E3, the power feed device 10 determines that the detected resonant point is caused by the coil provided near the power receiving coil 311 because the resonance number ND and the resonance number N match each other, to determine that feeding is supposed to be performed. In this manner, the power feed device 10 performs the resonance detection DR2 using the information regarding the resonance number N, which is provided by the power receiving device 30. As a result, this allows the power feed system 1 to increase detection accuracy in detecting the IC tag, the IC card, or the like.

[Effects]

As described above, according to the present embodiment, the resonance detections DR1 and DR2 are performed in addition to the foreign object detections DF1 and DF2, thus making it possible to increase safety.

According to the present embodiment, after the foreign object detection DF1 is performed using the alternating-current signal SDF having a low frequency, the resonance detection DR1 is performed using the alternating-current signal SDR having a high frequency, thus making it possible to make the IC tag, the IC card, or the like resistant to destruction.

According to the present embodiment, the alternating-current signal SDR having lower power than power of the power signal SP1 is used in the resonance detection DR1, thus making it possible to make the IC tag, the IC card, or the like resistant to destruction.

According to the present embodiment, in the resonance detection DR1, the switch 122 is turned on, thus making it possible to increase detectability of the IC tag, the IC card, or the like.

According to the present embodiment, the resonance detection DR1 is performed prior to starting communication, thus making is possible to increase safety.

According to the present embodiment, the resonance detection DR2 is performed using the resonance information IR provided by the smartphone that is a target to be supplied with power, thus making is possible to increase safety.

Modification Example 1

In the foregoing embodiment, in the resonance detection DR1, the predetermined threshold X that is compared with the resonance number ND is set to "1", but this is not limitative. For example, the predetermined threshold X may be set to a value equal to or larger than "2", or the predetermined threshold X may be set to "0".

Modification Example 2

In the foregoing embodiment, in a case where the power feed device 10 performs the resonance detection DR1, the power feed coil 123 does not configure a resonant circuit, but this is not limitative. In the following, the present modification example is described in detail with reference to some examples.

FIG. 15 illustrates a configuration example of a power feed device 10A according to the present modification example. The power feed device 10A includes capacitance elements 124 and 125 and a power feed controller 19A. The capacitance elements 124 and 125 correspond to the capacitance element 121 in the power feed device 10 (FIG. 2) according to the foregoing embodiment. The capacitance element 124 has one end coupled to one end of the switch 122 and the power feed section 11, and has the other end coupled to the other end of the switch 122 and one end of the capacitance element 125. The capacitance element 125 has the one end coupled to the other end of the capacitance element 124 and the other end of the switch 122, and has the other end coupled to one end of the power feed coil 123. The power feed controller 19A controls an operation in the power feed device 10A.

FIG. 16 schematically illustrates an operation example of the power feed section 11 and the switch 122 in the power feed device 10A. In a case where the power feed device 10A supplies power to the power receiving device 30, the switch 122 turns on, on the basis of an instruction from the power feed controller 19A, and the switch 122 short-circuits both ends of the capacitance element 124. Thereafter, the capacitance element 125 and the power feed coil 123 are coupled in series to configure a resonant circuit. The resonant circuit has a resonance frequency around the frequency of the power signal SP1. Thereafter, the power feed section 11 supplies the power signal SP1 to the resonant circuit.

In addition, in a case where the power feed device 10A performs the foreign object detection DF1, the switch 122 turns on, on the basis of the instruction from the power feed controller 19A. At this time, the capacitance element 125 and the power feed coil 123 are coupled in series to configure a resonant circuit. Thereafter, the power feed section 11 supplies the alternating-current signal SDF to the resonant circuit while sweeping the frequency of the alternating-current signal SDF across the frequency sweep range RDF.

In addition, in a case where the power feed device 10A performs the resonance detection DR1, the switch 122 turns off on the basis of the instruction from the power feed controller 19A. At this time, the capacitance elements 124 and 125 and the power feed coil 123 are coupled in series to configure a resonant circuit. The resonant circuit has a resonance frequency around the frequency fc, for example. Thereafter, the power feed section 11 supplies the alternating-current signal SDR to the resonant circuit while sweeping the frequency of the alternating-current signal SDR across the frequency sweep range RDR.

FIG. 17 illustrates a configuration example of another power feed device 10B according to the present modification example. The power feed device 10B includes power feed coils 126 and 127, a switch 128, and the power feed controller 19A. The power feed coils 126 and 127 correspond to the power feed coil 123 in the power feed device 10 (FIG. 2) according to the foregoing embodiment. The power feed coil 126 has one end coupled to one end of the switch 128 and the other end of the capacitance element 121, and has the other end coupled to the other end of the switch 128 and one end of the power feed coil 127. The power feed coil 127 has the one end coupled to the other end of the power feed coil 126 and the other end of the switch 128, and has the other end grounded. The power feed controller 19A controls an operation in the power feed device 10B.

FIG. 18 schematically illustrates an operation example of the power feed section 11 and the switch 128 in the power feed device 10B. In a case where the power feed device 10B supplies power to the power receiving device 30, the switch 128 turns off on the basis of an instruction from the power feed controller 19B. At this time, the capacitance element 121 and the power feed coils 126 and 127 are coupled in series to configure a resonant circuit. The resonant circuit has a resonance frequency around the frequency of the power signal SP1. Thereafter, the power feed section 11 supplies the power signal SP1 to the resonant circuit.

In addition, in a case where the power feed device 10B performs the foreign object detection DF1, the switch 128 turns off on the basis of the instruction from the power feed controller 19B. At this time, the capacitance element 121 and the power feed coils 126 and 127 are coupled in series to configure a resonant circuit. Thereafter, the power feed section 11 supplies the alternating-current signal SDF to the resonant circuit while sweeping the frequency of the alternating-current signal SDF across the frequency sweep range RDF.

In addition, in a case where the power feed device 10B performs the resonance detection DR1, the switch 128 turns on, on the basis of the instruction from the power feed controller 19B, and the switch 128 short-circuits both ends of the power feed coil 126. Thereafter, the capacitance element 121 and the power feed coil 127 are coupled in series to configure a resonant circuit. The resonant circuit has a resonance frequency around the frequency fc, for example. Thereafter, the power feed section 11 supplies the alternating-current signal SDR to the resonant circuit while sweeping the frequency of the alternating-current signal SDR across the frequency sweep range RDR.

In this manner, according to the present modification example, the power feed coil 123 configures a resonant circuit in a case where the resonance detection DR1 is performed. This makes it possible to increase detection accuracy in detecting the IC tag, the IC card, or the like. The power feed coil 123 configures the resonant circuit as described above; therefore, the resonant point of the resonant circuit also appears in the impedance characteristic ZDR measured by the resonance detection DR1. Thus, for example, in the resonance detection DR1, it is possible to set "2" for the predetermined threshold X that is compared with the resonance number ND.

Modification Example 3

In the foregoing embodiment, the resonance information IR includes the information regarding the resonance number N, but this is not limitative. For example, the resonance information IR may include information regarding the resonance frequency. In the following, a power feed system 1C according to the present modification example is described in detail. The power feed system 1C includes a smartphone 20C and a power feed device 10C.

FIG. 19 illustrates a configuration example of the smartphone 20C. As with the smartphone 20B (FIG. 4B), the smartphone 20C has a function to perform near field communication. The smartphone 20C includes a power receiving device 30C. The power receiving device 30C includes a storage section 36C that stores the resonance information IR. The resonance information IR also includes information regarding the resonance frequency fr in addition to the information regarding the resonance number N. The resonance frequency fr is a frequency at the resonant point in a case where a coil is provided near the power receiving coil 311. As in the case of the smartphone 20B (FIGS. 5 and 6), the smartphone 20C includes the coil 231 that is provided near the power receiving coil 311. Thus, the storage section 36C of the smartphone 20C stores the resonance number N (N=1), and also stores the resonance frequency fr at the resonant point.

The power feed device 10C includes a resonance detector 15C. As with the resonance detector 15 according to the foregoing embodiment, the resonance detector 15C performs the resonance detection DR1. In addition, the resonance detector 15C also has a function to perform the resonance detection DR2 on the basis of the information regarding the resonance number N and the resonance frequency fr that are included in the resonance information IR transmitted from the power receiving device 30C.

FIG. 20 illustrates a flowchart of a feeding operation in the power feed system 1C. As in the case of the power feed system 1 according to the foregoing embodiment (FIG. 7), the power feed device 10C first detects whether or not an object is placed on the feeding surface of the power feed device 10C (the step S1), and subsequently performs the foreign object detection DF1 and the resonance detection DR1 (the steps S2 and S3). Thereafter, the power feed device 10C starts communication with the power receiving device 30C (the step S4), obtains the foreign object determination information IF from the power receiving device 30C (the step S5), and performs the foreign object detection DF2 (the step S6).

Next, the power feed device 10C obtains, from the power receiving device 30C, the resonance information IR that includes the information regarding the resonance number N and the resonance frequency fr (the step S7). Next, the power feed device 10C performs the resonance detection DR2 (steps S21 to S23).

Specifically, first, the resonance detector 15C of the power feed device 10C calculates the number of resonant points (the resonance number NK) within the frequency sweep range RDR on the basis of the resonance information IR obtained in the step S7 (the step S21).

Next, the resonance detector 15C confirms whether or not the resonance number ND calculated in the resonance detection DR1 (the step S3) is larger than the resonance number NK calculated in the step S21 (ND >NK) (the step S22). In a case where the resonance number ND is larger than the resonance number NK ("Y" in the step S22), the resonance detector 15C determines that an IC tag, an IC card, or the like is present. In this case, the power feed device 10C stops communication with the power receiving device 30C (the step S9), and a flow of the operation returns to the step S1.

In the step S21, in a case where the resonance number ND is not larger than the resonance number NK ("N" in the step S22), the resonance detector 15C confirms whether or not a resonance frequency fd in the impedance characteristic ZDR measured in the resonance detection DR1 (the step S3) and the resonance frequency fr included in the resonance information IR obtained in the step S7 match each other (the step S23). It is to be noted that in a case where both of the resonance numbers ND and NK are "0", the resonance detector 15C determines that the resonance frequency fd and the resonance frequency fr match each other. In a case where the resonance frequency fd and the resonance frequency fr do not match each other ("N" in the step S23), the resonance detector 15C determines that an IC tag, an IC card, or the like is present. In this case, the power feed device 10C stops communication with the power receiving device 30C (the step S9), and the flow returns to the step S1.

In addition, in the step S23, in a case where the resonance frequency fd and the resonance frequency fr match each other ("Y" in the step S23), the power feed device 10C starts the actual feeding to the power receiving device 30C. Subsequent operations are similar to those in the case of the power feed system 1 according to the foregoing embodiment (FIG. 7).

In this manner, in the power feed system 1C, the resonance information IR includes the information regarding the resonance frequency fr, which makes it possible to start the actual feeding in a case where the resonance frequencies match each other. This makes it possible to increase detection accuracy in detecting the IC tag, the IC card, or the like.

The smartphone 20C includes the NFC communication section 23, but this is not limitative. Alternatively, the smartphone 20C may include another similar communication section 23C. The communication section 23C includes a coil 231C that is provided near the power receiving coil 311. The coil 231C configures a resonant circuit, and the resonant circuit has a resonance frequency of 10 MHz in this example. In this case, in the resonance information IR, the resonance number N is set to "1", and the resonance frequency fr is set to "10 MHz". The following describes an operation example in a case where the frequency sweep range RDR is not less than 11 MHz and not more than 15 MHz.

Operation Example F1

In this Operation Example F1, as with Operation Example E3 (FIG. 12), the smartphone 20C is placed on the feeding surface of the power feed device 10. In the smartphone 20C, the power receiving coil 311 and the coil 231C are arranged to have respective center points substantially coincident with each other. The coil 231C configures a resonant circuit having one resonant point. The resonant circuit has a resonance frequency of 10 MHz. However, the resonance frequency in this example is out of the frequency sweep range RDR. Thus, no resonant point appears in the impedance characteristic ZDR in the frequency sweep range RDR, and therefore the resonance number ND is "0". This resonance number ND is equal to or smaller than the predetermined threshold X ("1" in this example). Thus, in the resonance detection DR1, the resonance detector 15C determines that an IC tag, an IC card, or the like is not present.

In the resonance detection DR2, the resonance detector 15C calculates the resonance number NK within the frequency sweep range RDR on the basis of the resonance information IR (the step S21). In this example, the resonance number NK is "0". Therefore, the resonance number ND is not larger than the resonance number NK ("N" in the step S22), and both of the resonance numbers ND and NK are "0" ("Y" in the step S23). Thus, the resonance detector 15C determines that an IC tag, an IC card, or the like is not present.

In this manner, in Operation Example F1, it is determined that an IC tag, an IC card, or the like is not present, and therefore the power feed device 10C performs the actual feeding to the power receiving device 30C.

Operation Example F2

In this Operation Example F2, as with Operation Example E4 (FIG. 13), the IC card 9 is inserted between the power feed device 10C and the smartphone 20C. In this case, one resonant point caused by the IC card 9 appears in the impedance characteristic ZDR in the frequency sweep range RDR, and therefore the resonance number ND is "1". This resonance number ND is equal to or smaller than the predetermined threshold X. Thus, in the resonance detection DR1, the resonance detector 15C determines that an IC tag, an IC card, or the like is not present.

In contrast, in the resonance detection DR2, as in the case of Operation Example F1, the resonance number NK is "0", and therefore the resonance number ND is larger than the resonance number NK ("Y" in the step S22). Thus, the resonance detector 15C determines that an IC tag, an IC card, or the like is present.

In this manner, in Operation Example F2, it is determined that an IC tag, an IC card, or the like is present, and therefore the power feed device 10C does not perform the actual feeding to the power receiving device 30C.

As described above, in the power feed system 1C according to the present modification example, the resonance information IR includes the information regarding the resonance frequency fr in addition to the resonance number N, thus making it possible to increase detection accuracy. In other words, for example, in Operation Example F2 (FIG. 13), in a case of performing the resonance detection DR2 only on the basis of the resonance number N as in the foregoing embodiment, the resonance number ND (ND=1) and the resonance number N (N=1) match each other, which results in a determination that an IC tag, an IC card, or the like is not present. The frequency at the resonant point indicated by the resonance number N is 10 MHz, and is out of the frequency sweep range RDR. Thus, in such a case, it is not appropriate to compare the resonance number ND and the resonance number N. In the power feed system 1C according to the present modification example, the resonance information IR includes the information regarding the resonance frequency fr in addition to the resonance number N. This allows the power feed device 10C to calculate the resonance number NK within the frequency sweep range RDR. Thus, the power feed device 10C compares the resonance number N and the resonance number NK, thereby making it possible to more accurately detect whether or not an IC tag, an IC card, or the like is present.

Modification Example 4

In the foregoing embodiment, the resonance information IR includes the information regarding the resonance number N, but this is not limitative. For example, as with a smartphone 20D illustrated in FIG. 21, the resonance information IR may further include information regarding an impedance at the resonant point (resonance impedance). The smartphone 20D includes a power receiving device 30D. The power receiving device 30D includes a storage section 36D that stores the resonance information IR. The resonance information IR also includes information regarding a resonance impedance Zr in addition to the information regarding the resonance number N. The resonance impedance Zr is an impedance at the resonant point in a case where a coil is provided near the power receiving coil 311. As in the case of the smartphone 20B (FIGS. 5 and 6), the smartphone 20D includes the coil 231 near the power receiving coil 311. Thus, the storage section 36D of the smartphone 20D stores the resonance number N (N=1) and also stores the resonance impedance Zr at the resonant point. The resonance impedance Zr corresponds to detectability of the resonant point in a case where the power feed device detects the resonant point. In performing the resonance detections DR1 and DR2, it is possible for the power feed device to use this resonance impedance Zr.

Modification Example 5

In the foregoing embodiment, the same power feed coil 123 is used in the foreign object detections DF1 and DF2, in the resonance detections DR1 and DR2, and in the feeding operation, but this is not limitative. In the following, a power feed device 10D according to the present modification example is described in detail.

FIG. 22 illustrates a configuration example of the power feed device 10D. The power feed device 10D includes a power feed section 11D, a signal generator 41D, a capacitance element 421D, a coil 422D, a resonance detector 45D, and a power feed controller 19D.

As with the power feed section 11 according to the foregoing embodiment, the power feed section 11D generates the power signal SP1 that is alternating current, on the basis of an instruction from the power feed controller 19D. In addition, the power feed section 11D also has a function to generate the alternating-current signal SDF in the foreign object detection DF1. In addition, the power feed section 11D also has a function to transmit the feeding control signal CTL1 to the power receiving device 30. In other words, the power feed section 11D omits, from the power feed section 11 according to the foregoing embodiment, the function to generate the alternating-current signal SDR in the resonance detection DR1.

The capacitance element 121 and the power feed coil 123 are coupled in series to configure a resonant circuit. The resonant circuit has a resonance frequency around the frequency of the power signal SP1.

In the resonance detection DR1, the signal generator 41D generates the alternating-current signal SDR on the basis of the instruction from the power feed controller 19D. At the time, the signal generator 41D sweeps the frequency of the alternating-current signal SDR across the predetermined frequency range (frequency sweep range RDR) that includes the frequency fc (for example, 13.56 MHz) of the carrier wave used by the IC tag, the IC card, or the like.

The capacitance element 421D has one end coupled to the signal generator 41D, and has the other end coupled to the coil 422D. The coil 422D has one end coupled to the other end of the capacitance element 421D, and has the other end grounded. The capacitance element 421D and the coil 422D are coupled in series to configure a resonant circuit. The resonant circuit has a resonance frequency around the frequency fc, for example. As in the case of the smartphone 20B (FIGS. 5 and 6), the coil 422D is provided near the power feed coil 123.

As with the resonance detector 15 according to the foregoing embodiment, the resonance detector 45D performs the resonance detection DR1 on the basis of the voltage at the one end of the coil 422D. Specifically, during a period in which the signal generator 41D generates the alternating-current signal SDR, the resonance detector 45D measures the frequency characteristic of the impedance (impedance characteristic ZDR) as viewed from the resonance detector 45D, on the basis of the voltage at the one end of the coil 422D. Thereafter, the resonance detector 45D detects, on the basis of the impedance characteristic ZDR, whether or not an IC tag, an IC card, or the like is present. In addition, as with the resonance detector 15 according to the foregoing embodiment, the resonance detector 45D also has a function to perform the resonance detection DR2 after starting communication with the power receiving device 30.

The power feed controller 19D controls an operation in the power feed device 10D.

The power feed device 10D uses the power feed coil 123 in a case of performing the foreign object detections DF1 and DF2, feeding, and communication, and uses the coil 422D in a case of performing the resonance detections DR1 and DR2. Thus, for example, it is possible to perform the resonance detections DR1 and DR2 during a given period. Specifically, for example, it is possible for the power feed device 10D to perform the resonance detections DR1 and DR2 while performing feeding. In this case, for example, even in a case where during the feeding, an IC tag, an IC card, or the like is inserted between the power feed device 10D and the power receiving device 30, it is possible to stop power supply, thus making it possible to increase safety.

FIG. 23 illustrates a configuration example of another power feed device 10E according to the present modification example. The power feed device 10E includes a power feed section 11E and a power feed controller 19E. As with the power feed section 11 according to the foregoing embodiment, the power feed section 11E generates the power signal SP1 that is alternating current, on the basis of an instruction from the power feed controller 19E. In addition, the power feed section 11E also has a function to generate the alternating-current signal SDF in the foreign object detection DF1 and to generate the alternating-current signal SDR in the resonance detection DR1. In addition, the power feed section 11E also has a function to transmit the feeding control signal CTL1 to the power receiving device 30. In other words, the power feed section 11E corresponds to an integration of the power feed section 11D and the signal generator 41D in the power feed device 10D. The power feed controller 19E controls an operation in the power feed device 10E. This configuration also allows for achievement of same effects as those in the power feed device 10D.

Modification Example 6

In the foregoing embodiment, the power feed device 10 performs the foreign object detection DF1 and the resonance detection DR1, then starts communication, then performs the foreign object detection DF2 and the resonance detection DR2, and thereafter starts actual feeding, but this is not limitative. Alternatively, for example, as illustrated in FIGS. 24 and 25, one or both of the foreign object detection DF2 and the resonance detection DR2 may be omitted in accordance with a feeding standard with which the power receiving device 30 complies. In examples in FIGS. 24 and 25, after starting communication in the step S4, the power feed device 10 obtains, for example, from the power receiving device 30, information regarding the feeding standard with which the power receiving device 30 complies (the step S31). Thereafter, in a case where the feeding standard with which the power receiving device 30 complies is Standard A, the power feed device 10 performs the foreign object detection DF2 and the resonance detection DR2. In addition, in a case where the feeding standard with which the power receiving device 30 complies is Standard B, the power feed device 10 omits one or both of the foreign object detection DF2 and the resonance detection DR2. In the example in FIG. 24, the power feed device 10 omits both of the foreign object detection DF2 and the resonance detection DR2, and starts feeding. In the example in FIG. 25, the power feed device 10 omits the foreign object detection DF2, performs the resonance detection DR2, and thereafter starts feeding.

Although the present technology has been described above referring to the embodiments and modification examples, the present technology is not limited to the embodiments, etc., and may be modified in a variety of ways.

For example, in the foregoing embodiment, etc., the impedance characteristic ZDR is measured through sweeping the frequency in the resonance detection DR1, but this is not limitative. Alternatively, for example, the impedance at the frequency fc may be obtained without sweeping the frequency. Even in this case, it is possible to detect, on the basis of this impedance, whether or not a resonant point is present around the frequency fc. At the time, the power receiving device 30 may provide, to the power feed device 10, the resonance information IR including information regarding the impedance at the frequency fc. This allows the power feed device 10 to detect whether or not an IC tag, an IC card, or the like is present, on the basis of the measured impedance and the impedance obtained from the power receiving device 30. For example, in a case where a resonant point caused by the coil 231 and a resonant point caused by the IC tag are present around the frequency fc, there is a possibility that an impedance disruption occurring at the frequency fc causes the power feed device 10 to falsely determine that no resonant point is present. However, even in this case, it is possible to correct such a false determination with use of the impedance obtained from the power receiving device 30.

In addition, in the foregoing embodiment, etc., the resonance detector 15 measures the frequency characteristic of the impedance (impedance characteristic ZDR) as viewed from the resonance detector 15, and calculates the resonance number ND on the basis of a result of the measurement, but this is not limitative. Alternatively, for example, one or more parameters such as quality factor, resistance, reactance, admittance, conductance, susceptance, self-inductance value, mutual inductance value, coupling coefficient, signal amplitude, and phase may be measured to calculate the resonance number ND on the basis of a result of the measurement.

In addition, in the foregoing embodiment, etc., the resonance detector 15 detects whether or not an IC tag, an IC card, or the like is present, on the basis of the resonance number ND, but this is not limitative. For example, it is possible to detect whether or not an IC tag, an IC card, or the like is present, on the basis of any of various parameters that change depending on frequency. For example, such parameters may be electrical parameters related to a coil or a circuit including the coil. Specifically, for example, it is possible to use one or more parameters such as quality factor (Q value), impedance value (Z value), resistance value (R value), capacitance (C value), self-inductance value (L value), mutual inductance value (M value), coupling coefficient (K value), induced electromotive force, magnetic flux density, magnetic field intensity, electric field intensity, feeding power value, feeding voltage value, feeding current value, receiving power value, receiving voltage value, receiving current value, coil power value, coil voltage value, coil current value, power factor, energy efficiency, transmission efficiency, feeding efficiency, charge efficiency, energy loss, signal amplitude, signal phase, signal level, noise level, modulation degree, and temperature. In the following, a power feed system 1G is described in detail that uses the quality factor to detect whether or not an IC tag, an IC card, or the like is present. The power feed system 1G includes a power feed device 10G. The power feed device 10G includes a resonance detector 15G.

The resonance detector 15G performs the resonance detection DR1 on the basis of the voltage at the one end of the power feed coil 123. Specifically, the resonance detector 15G calculates a quality factor QDR in the frequency sweep range RDR during a period in which the power feed section 11 generates the alternating-current signal SDR. The resonance detector 15G detects whether or not an IC tag, an IC card, or the like is present, on the basis of the quality factor QDR. In addition, the resonance detector 15G also has a function to perform the resonance detection DR2 on the basis of the quality factor QDR and the resonance information IR transmitted from the power receiving device 30, after the power feed device 10G and the power receiving device 30 start communication with each other. In this case, the resonance information IR includes a reference quality factor in the frequency sweep range RDR. The reference quality factor may be the same as or different from the reference quality factor Q included in the foreign object determination information IF.

FIG. 26 illustrates a flowchart of a feeding operation in the power feed system 1G. In step S43, the power feed device 10G performs the resonance detection DR1. Specifically, first, the power feed controller 19 turns on the switch 122, and the power feed section 11 generates the alternating-current signal SDR. At the time, the power feed section 11 sweeps the frequency of the alternating-current signal SDR across the frequency sweep range RDR. Thereafter, the resonance detector 15G calculates the quality factor QDR in the frequency sweep range RDR. Thereafter, in a case where the calculated quality factor QDR is not within a predetermined range ("N" in the step S43), the resonance detector 15G determines that an IC tag, an IC card, or the like is present, and a flow of the operation returns to step S1. This predetermined range in the resonance detection DR1 may be the same as or different from the predetermined range in the foreign object detection DF1. In addition, in a case where the calculated quality factor QDR is within the predetermined range ("Y" in the step S43), the resonance detector 15G determines that an IC tag, an IC card, or the like is not present, and the flow proceeds to the step S4.

In step S48, the power feed device 10G performs the resonance detection DR2. Specifically, the resonance detector 15G compares the quality factor QDR calculated in the resonance detection DR1 (the step S43) and the reference quality factor included in the resonance information IR obtained in the step S7. Thereafter, in a case where the quality factor QDR is not within a predetermined range that is set on the basis of the reference quality factor ("N" in the step S48), the resonance detector 15G determines that an IC tag, an IC card, or the like is present. In this case, the power feed device 10G stops communication with the power receiving device 30 (the step S9), and the flow returns to step S1. In addition, in a case where the quality factor QDR is within the predetermined range that is set on the basis of the reference quality factor ("Y" in the step S48), the resonance detector 15G determines that an IC tag, an IC card, or the like is not present, and the flow proceeds to the step S17.

It is to be noted that in this example, the resonance information IR is obtained in the step S7, but this is not limitative. For example, the step S7 may be omitted. In this case, as in the resonance detection DR1 (the step S43), the resonance detector 15G confirms whether or not the quality factor QDR is within the predetermined range. Even in this case, for example, in a case where, between the steps S43 and S48, an IC tag, an IC card, or the like is inserted between the power feed device 10G and the power receiving device 30, it is possible to detect the IC tag, the IC card, or the like.

In addition, in the foregoing embodiment, etc., the foreign object detector 14 detects whether or not a foreign object is present, on the basis of the quality factor QD, but this is not limitative. For example, it is possible to detect whether or not a foreign object is present, on the basis of any of various parameters that change depending on frequency. For example, such parameters may be electrical parameters related to a coil or a circuit including the coil. Specifically, for example, it is possible to use one or more parameters such as quality factor (Q value), impedance value (Z value), resistance value (R value), capacitance (C value), self-inductance value (L value), mutual inductance value (M value), coupling coefficient (K value), induced electromotive force, magnetic flux density, magnetic field intensity, electric field intensity, feeding power value, feeding voltage value, feeding current value, receiving power value, receiving voltage value, receiving current value, coil power value, coil voltage value, coil current value, power factor, energy efficiency, transmission efficiency, feeding efficiency, charge efficiency, energy loss, signal amplitude, signal phase, signal level, noise level, modulation degree, and temperature.

In addition, in the foregoing embodiment, etc., the detection target is an IC tag, an IC card, or the like, but this is not limitative. For example, the detection target may be an RFID (Radio Frequency Identification). In addition, the detection target may not necessarily include a coil, and may be, for example, any of various devices that perform near field communication using an antenna, an electrode, and so on.

In addition, in the foregoing embodiment, etc., the present technology is applied to a power feed system that supplies power to an electronic apparatus, but this is not limitative. Specifically, for example, the present technology may be applied to a power feed system that supplies power to an electric vehicle, an electric automobile, and so on.

It is to be noted that effects described herein are merely illustrative and are not limitative, and may have other effects.

It is to be noted that the technology may have the following configurations.

(1)
A power receiving device, including:
a power receiving section that receives power from a power feed device with use of a power receiving coil; and
a communication section that transmits coil information to the power feed device, the coil information indicating whether or not a coil is provided near the power receiving coil.

(2)
The power receiving device according to (1), in which
the communication section transmits power-receiving coil information to the power feed device, the power-receiving coil information corresponding to a characteristic of the power receiving coil.

(3)
The power receiving device according to (2), in which
the communication section transmits the coil information after transmitting the power-receiving coil information.

(4)
The power receiving device according to any one of (1) to (3), in which
the coil is provided near the power receiving coil and configures a resonant circuit, and
the coil information includes information regarding number of resonant points in the resonant circuit.

(5)
The power receiving device according to any one of (1) to (4), in which
the coil is provided near the power receiving coil and configures a resonant circuit, and
the coil information includes information regarding a resonance frequency of the resonant circuit.

(6)
The power receiving device according to any one of (1) to (5), in which
the coil is provided near the power receiving coil and configures a resonant circuit, and
the coil information includes information regarding an impedance of the resonant circuit.

(7)
The power receiving device according to any one of (1) to (6), in which
the coil is provided near the power receiving coil and configures a resonant circuit, and
the resonant circuit has a resonant frequency around 13.56 MHz.

(8)
The power receiving device according to any one of (1) to (7), in which
the communication section receives response information after transmitting the coil information, the response information indicating whether or not the power feed device is to supply power to the power receiving section.

(9)
The power receiving device according to (8), in which
in a case where the response information indicates that power is to be supplied, the communication section transmits a request to the power feed device for an increase in feeding power.

(10)
The power receiving device according to any one of (1) to (9), in which
the power receiving section starts charging a secondary battery after the communication section transmits the coil information to the power feed device.

(11)
The power receiving device according to any one of (1) to (10), in which
the coil is used for communication.

(12)
The power receiving device according to any one of (1) to (11), in which
the communication section transmits the coil information through modulating an impedance of the communication section during a period in which the communication section receives a predetermined signal transmitted from the power feed device.

(13)
An electronic apparatus, including:
a power receiving section that receives power from a power feed device with use of a power receiving coil; and
a communication section that transmits coil information to the power feed device, the coil information indicating whether or not a coil is provided near the power receiving coil.

(14)
The electronic apparatus according to (13), including the power receiving coil and the coil, in which
the power receiving coil and the coil are planar coils, and provided in a same plane, and
one of the power receiving coil and the coil is provided inside another.

This application claims the benefit of Japanese Priority Patent Application No. 2016-149321 filed with the Japan Patent Office on Jul. 29, 2016, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A power receiving device, comprising:
a power receiving section configured to receive power from a power feed device with use of a power receiving coil; and
a communication section configured to transmit coil information regarding the power receiving coil to the power feed device, the coil information indicating whether the power receiving device comprises a coil provided near the power receiving coil, wherein the power receiving device comprises the coil which is provided near the power receiving coil and configures a resonant circuit,
the coil information includes information regarding an impedance of the resonant circuit,
the communication section is configured to receive response information after transmitting the coil information, the response information indicating whether the power feed device is to supply power to the power receiving section, and
in a case where the response information indicates that power is to be supplied, the communication section is configured to transmit a request to the power feed device for an increase in feeding power.

2. The power receiving device according to claim 1, wherein
the communication section is configured to transmit power-receiving coil information to the power feed device, the power-receiving coil information corresponding to a characteristic of the power receiving coil.

3. The power receiving device according to claim 2, wherein the communication section is configured to transmit the coil information after transmitting the power-receiving coil information.

4. The power receiving device according to claim 1, wherein
the coil information includes information regarding number of resonant points in the resonant circuit, or
the coil information includes information regarding number of resonant points in the resonant circuit and at least one of information regarding a resonance frequency of the resonant circuit, the information regarding the impedance of the resonant circuit, or information regarding a quality factor of the resonant circuit.

5. The power receiving device according to claim 1, wherein
the coil information includes information regarding a resonance frequency of the resonant circuit.

6. The power receiving device according to claim 1, wherein
the resonant circuit has a resonant frequency around 13.56 MHz.

7. The power receiving device according to claim 1, wherein
the power receiving section is configured to start charging a secondary battery after the communication section transmits the coil information to the power feed device.

8. The power receiving device according to claim 1, wherein
the coil is used for communication.

9. The power receiving device according to claim 1, wherein
the communication section is configured to transmit the coil information through modulating an impedance of the communication section during a period in which the communication section receives a predetermined signal transmitted from the power feed device.

10. An electronic apparatus, comprising:
a power receiving section configured to receive power from a power feed device with use of a power receiving coil; and
a communication section configured to transmit coil information regarding the power receiving coil to the power feed device, the coil information indicating whether the power receiving section comprises a coil provided near the power receiving coil, wherein the power receiving section comprises the coil which is provided near the power receiving coil and configures a resonant circuit,
the coil information includes information regarding an impedance of the resonant circuit,
the communication section is configured to receive response information after transmitting the coil information, the response information indicating whether the power feed device is to supply power to the power receiving section, and
in a case where the response information indicates that power is to be supplied, the communication section is configured to transmit a request to the power feed device for an increase in feeding power.

11. The electronic apparatus according to claim 10, comprising the power receiving coil and the coil, wherein
the power receiving coil and the coil are planar coils, and provided in a same plane, and
one of the power receiving coil and the coil is provided inside another.

12. An electronic apparatus, comprising:
a power receiving coil;
a coil provided near the power receiving coil;
a power receiving section configured to receive power from a power feed device with use of the power receiving coil; and
a communication section that transmits, to the power feed device, power- receiving coil information regarding the power receiving coil, wherein the power receiving section comprises the coil which is provided near the power receiving coil and configures a resonant circuit,
the coil information includes information regarding an impedance of the resonant circuit,
the communication section is configured to receive response information after transmitting the coil information, the response information indicating whether the power feed device is to supply power to the power receiving section, and
in a case where the response information indicates that power is to be supplied, the communication section is configured to transmit a request to the power feed device for an increase in feeding power.

13. The electronic apparatus according to claim 12, wherein
the power-receiving coil information includes information regarding a quality factor of the resonant circuit.

14. The electronic apparatus according to claim 12, wherein
the power feed device is configured to detect whether a foreign object is present on a basis of the power-receiving coil information.

15. The electronic apparatus according to claim 12, wherein
the power receiving section configured to start charging a secondary battery after the communication section transmits the power-receiving coil information to the power feed device.

16. The electronic apparatus according to claim 12, wherein
during a period in which the communication section receives a predetermined signal transmitted from the power feed device, the communication section is configured to transmit the power-receiving coil information through modulating an impedance of the communication section.

17. The electronic apparatus according to claim 12, wherein
the power receiving coil and the coil are planar coils, and provided in a same plane, and one of the power receiving coil and the coil is provided inside another.

* * * * *